United States Patent
He et al.

(10) Patent No.: US 11,782,189 B2
(45) Date of Patent: Oct. 10, 2023

(54) DISPLAY PANEL AND DISPLAY DEVICE

(71) Applicant: WuHan TianMa Micro-electronics CO., LTD., Wuhan (CN)

(72) Inventors: Zhiwei He, Wuhan (CN); Yangzhao Ma, Wuhan (CN); Zhiqiang Xia, Wuhan (CN); Ruiyuan Zhou, Wuhan (CN)

(73) Assignee: WuHan TianMa Micro-electronics CO., LTD., Wuhan (CN)

( * ) Notice: Subject to any disclaimer, the term of this patent is extended or adjusted under 35 U.S.C. 154(b) by 382 days.

(21) Appl. No.: 17/006,746

(22) Filed: Aug. 28, 2020

(65) Prior Publication Data

US 2021/0405260 A1    Dec. 30, 2021

(30) Foreign Application Priority Data

Jun. 29, 2020 (CN) .......................... 202010609862.X

(51) Int. Cl.
 *G02B 1/10* (2015.01)
(52) U.S. Cl.
 CPC .......... *G02B 1/10* (2013.01); *G02B 2207/123* (2013.01)
(58) Field of Classification Search
 CPC ... G02B 1/10; G02B 2207/123; G06F 1/1637; G06F 1/1609; G06F 1/1686; G09F 9/00;
 (Continued)

(56) References Cited

U.S. PATENT DOCUMENTS

| | | | | |
|---|---|---|---|---|
| 2021/0407445 A1* | 12/2021 | Wang | .................... | G09G 3/3648 |
| 2022/0045218 A1* | 2/2022 | Liu | ........................ | H01L 27/124 |
| 2022/0130943 A1* | 4/2022 | Wang | ................. | H01L 27/3279 |

FOREIGN PATENT DOCUMENTS

| | | |
|---|---|---|
| CN | 110070801 A | 7/2019 |
| CN | 110618557 A | 12/2019 |

(Continued)

OTHER PUBLICATIONS

First Chinese Office Action dated Jul. 25, 2022, issued in corresponding Chinese Application No. 202010609862.X, filed on Jun. 29, 2020.

*Primary Examiner* — Alicia M Harrington
*Assistant Examiner* — Kuei-Jen L Edenfield
(74) *Attorney, Agent, or Firm* — CHRISTENSEN O'CONNOR JOHNSON KINDNESS PLLC

(57) ABSTRACT

The present disclosure provides a display panel and a display device including the display panel. The display panel has a display region including a first display region and a second display region, and the first display region has a smaller sub-pixel density than the second display region. Light-shielding structures are arranged in the first display region, and one light-shielding structure overlaps a light-emitting region of at least one first sub-pixel. The light-shielding structure group constituted by the light-shielding structures includes main and auxiliary light-shielding structures having the same shape. When viewed from the top at the same viewing angle, the auxiliary light-shielding structure is equivalent to a structure obtained by rotating the main light-shielding structure by a certain angle in a plane where the main light-shielding structure is located. With this design, a light diffraction phenomenon is alleviated and the imaging quality of the under-screen optical device is improved.

24 Claims, 11 Drawing Sheets

(58) Field of Classification Search
CPC .............. H01L 27/3218; H01L 27/3272; H01L 27/3234; H01L 27/326; H01L 51/5253; H01L 2227/323; G02F 1/133512; G02F 1/133391; G02F 1/133388; H10K 59/353; H10K 59/126
USPC ................. 257/59, 40; 359/601; 349/112
See application file for complete search history.

(56) References Cited

FOREIGN PATENT DOCUMENTS

| CN | 111192978 A | 5/2020 |
| CN | 111276055 A | 6/2020 |

\* cited by examiner

DISPLAY PANEL AND DISPLAY DEVICE

CROSS-REFERENCE TO RELATED APPLICATIONS

The present application claims priority to Chinese Patent Application No. 202010609862.X, filed on Jun. 29, 2020, the content of which is incorporated herein by reference in its entirety.

FIELD

The present disclosure relates to the field of display technologies, and more particularly, to a display panel and a display device.

BACKGROUND

For an electronic product, devices such as a front camera will inevitably occupy a certain space at a front surface of the display screen, thereby affecting a screen ratio. In order to achieve a true full screen, researchers have proposed an implementation for setting the devices under the screen, in which the optical device such as a camera is provided under a light-emitting device of the display panel, that is, the optical device is arranged in a display region, in a position where the optical device is located can display normally, and when the optical device needs to be used, light passes through the display panel to reach the optical device and is then utilized by the optical device. However, when in use, the under-screen optical device still has a poor imaging quality, generally not satisfying users' needs.

SUMMARY

The embodiments of the present disclosure provide a display panel and a display device, aiming to solve the problem of poor imaging effect of the under-screen optical device in the related art, to improve the imaging effect of the under-screen optical device and improve the user experience.

In one aspect, an embodiment of the present disclosure provides a display panel. The display panel has a display region comprising a first display region and a second display region, the display panel includes a plurality of sub-pixels located in the display region and comprising first sub-pixels located in the first display region and second sub-pixels located in the second display region, a density of the first sub-pixels being smaller than a density of the second sub-pixels; a base substrate; and a light-shielding structure array located on the base substrate in the first display region and comprising a plurality of light-shielding structures, the plurality of light-shielding structures being divided into at least one light-shielding structure group. In a direction perpendicular to the display panel, one of the plurality of light-shielding structures overlaps a light-emitting region of at least one of the first sub-pixels. Each of the at least one light-shielding structure group comprises a main light-shielding structure and at least one auxiliary light-shielding structure, an orthographic projection of the main light-shielding structure onto the base substrate is a main projection, an orthographic projection of each of the at least one auxiliary light-shielding structure onto the base substrate is an auxiliary projection, and a shape of the main projection is the same as a shape of the auxiliary projection. The main projection comprises a main vertex angle, the auxiliary projection comprises an auxiliary vertex angle, and the main vertex angle and the auxiliary vertex angle form corresponding angles to each other. A main vector is formed by a gravity center of the main projection as a starting point and the main vertex angle as an end point. In each auxiliary projection, an auxiliary vector is formed by a gravity center of the auxiliary projection as a starting point and the auxiliary vertex angle of the auxiliary projection as an end point, and a direction of the main vector is different from a direction of the auxiliary vector.

In another aspect, an embodiment of the present disclosure provides a display device including the display penal provided in the first aspect.

BRIEF DESCRIPTION OF DRAWINGS

In order to more clearly illustrate technical solutions in embodiments of the present disclosure or in the related art, the accompanying drawings used in the embodiments and in the related art are briefly introduced below. It should be noted that the drawings described below are merely part of the embodiments of the present disclosure, and other drawings can also be acquired by those skilled in the art without paying creative efforts.

DESCRIPTION OF EMBODIMENTS

Figure 1:
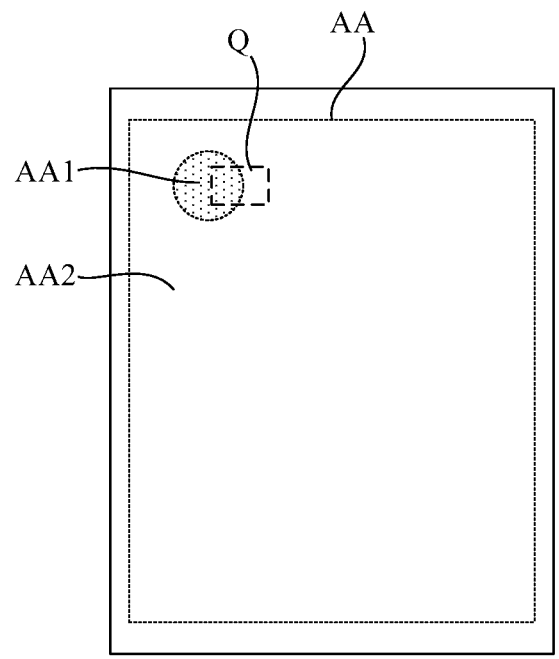
FIG. 1 is a schematic top view of a display panel according to an embodiment of the present disclosure.

In order to make the purpose, technical solutions, and advantages of the embodiments of the present disclosure understandable, the technical solutions in the embodiments of the present disclosure are described below with reference to the accompanying drawings. It should be understood that the described embodiments are merely exemplary embodiments of the present disclosure, which shall not be interpreted as providing limitations to the present disclosure. All other embodiments obtained by those skilled in the art according to the embodiments of the present disclosure without creative efforts are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

The display region of the display device includes non-light-transmitting areas such as a pixel light-emitting region and a metal wiring area. When the design of the under-screen optical device is adopted, the light can be received by the optical device only when the light passes through the light-transmitting area of the display panel. A light-transmitting area between adjacent metal traces in the display region or a light-emitting region between some adjacent pixel light-emitting regions has a small size that is close to a wavelength of visible light, and serious light diffraction will occur when light passes through the light-transmitting area, leading to a poor imaging quality of the under-screen optical device.

An embodiment of the present disclosure designs the structure in the non-light-transmitting area of the display region corresponding to the optical device, to alleviate the light diffraction that occurs when light passes through the display panel (a first display region of the display panel in the present disclosure) and to improve the imaging quality of the under-screen optical device. In this embodiment, a light-shielding structure array including a plurality of light-shielding structures is arranged in the first display region, and the light-shielding structure array includes light-shielding structure groups. In each light-shielding structure group, the light-shielding structures have the same shape, but are equivalent to structures obtained by rotating a same light-shielding structure by different angles in the plane where the light-shielding structures are located (i.e., oriented with different angles relative to a same light-shielding structure in the plane where the light-shielding structures are located).

That is, when viewed from the top at a same viewing angle, in the light-shielding structure group, the corresponding angles of the light-shielding structures having the same shape are oriented differently from each other, and the corresponding edges of the light-shielding structures having the same shape (the corresponding edges may be interpreted by referring to the description of the following embodiments) extend in different directions from each other. In this way, light diffractions around the corresponding edges of the light-shielding structures have different diffraction directions, increasing light diffraction directions, alleviating the light diffraction effect, and thus improving the imaging quality of the under-screen optical device. The invention will be illustrated below through the following embodiments.

Figure 2:
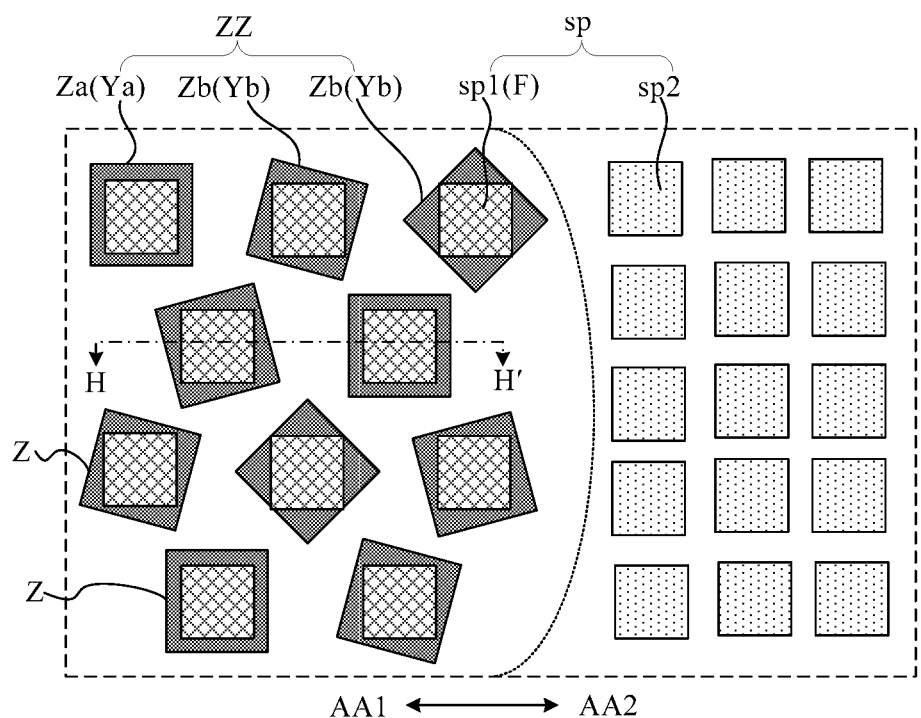
FIG. 2 is a schematic enlarged view of an area Q shown in FIG. 1.
Figure 3:
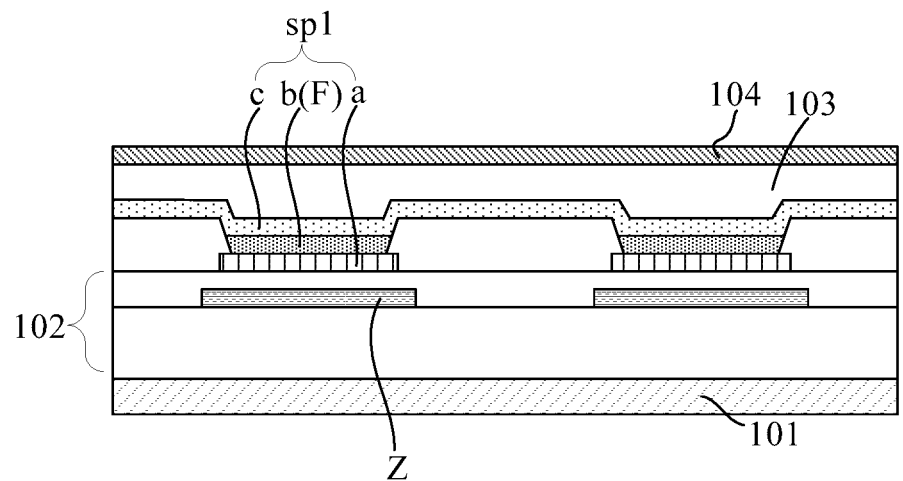
FIG. 3 is a simplified schematic view of a cross-section taken along line H-H' shown in FIG. 2.
Figure 4:
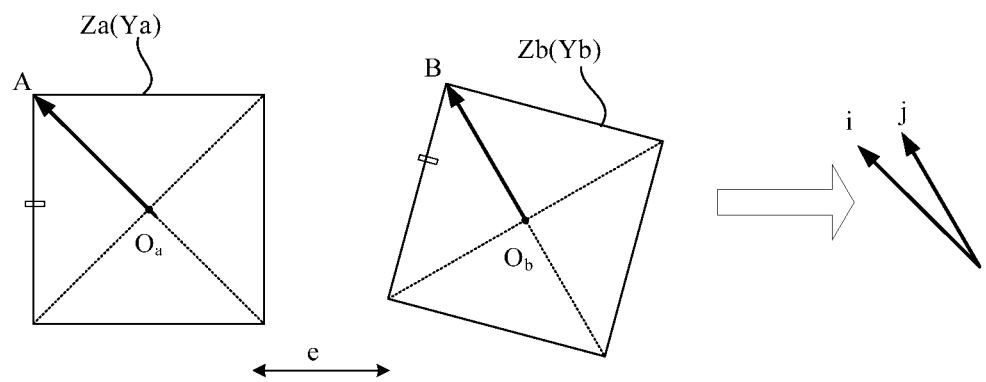
FIG. 4 is a schematic partial top view of a first display region according to an embodiment of the present disclosure.

FIG. 1 is a schematic top view of a display panel according to an embodiment of the present disclosure. FIG. 2 is a schematic enlarged view of an area Q shown in FIG. 1. FIG. 3 is a simplified schematic view of a cross-section taken along line H-H' shown in FIG. 2. FIG. 4 is a schematic partial top view of a first display region according to an embodiment of the present disclosure.

As shown in FIG. 1, the display panel has a display region AA including a first display region AA1 and a second display region AA2. FIG. 1 illustrates an exemplary case where the first display region AA1 is surrounded by the second display region AA2. In another embodiment, a side of the first display region is adjacent to a non-display region, and the second display region partially surrounds the first display region. In still another embodiment, the display region further has a third display region, and the third display region at least partially surrounds the second display region. In addition, the shape of the first display region is not limited in the embodiments of the present disclosure, and may a circle or an arbitrary polygon.

As shown in FIG. 2, a plurality of sub-pixels sp is provided in the display region AA, and the plurality of sub-pixels sp includes a plurality of first sub-pixels sp1 and a plurality of second sub-pixels sp2. The plurality of first sub-pixels sp1 is located in the first display region AA1, and the plurality of second sub-pixels sp2 is located in the second display region AA2. A density of the plurality of first sub-pixels sp1 is smaller than a density of the plurality of second sub-pixels sp2. That is, a density of sub-pixels in the first display region AA1 is smaller than a density of sub-pixels in the second display region AA2. When the display panel provided by this embodiment is combined with the design with an under-screen optical device, the optical device is arranged under the first display region. Since the density of sub-pixels in the first display region is decreased, a light-transmitting area of the first display region will be accordingly increased, increasing transmittance of light that passes through the first display region. Accordingly, a greater amount of light can be received by the optical device, which is beneficial to improve an imaging effect of the optical device. In an embodiment, in a case where the display region further includes a third display region, a density of sub-pixels in the third display region is greater than a density of sub-pixels in the second display region.

The display panel further includes a light-shielding structure array in the first display region AA1. As shown in FIG. 2, the light-shielding structure array is partially illustrated, and the light-shielding structure array includes a plurality of light-shielding structures Z. In the display panel, the light-shielding structure array is located on a base substrate, that is, the plurality of light-shielding structures is located on the base substrate. As shown schematically in the cross-section in FIG. 3, the display panel includes a base substrate 101, and light-shielding structures Z on the base substrate. In this embodiment of the present disclosure, in a direction perpendicular to the display panel, one light-shielding structure Z overlaps a light-emitting region F of at least one first sub-pixel sp1. As shown in FIG. 3, an array layer 102 on the base substrate 101 is illustrated, and the light-shielding structure Z is located in the array layer 102. The first sub-pixel sp1 includes an anode a, a light-emitting layer b, and a cathode c. After a voltage is applied between the anode a and the cathode c, the light-emitting layer b is excited to emit light, and an area of the light-emitting region F of the first sub-pixel sp1 is substantially equal to an area of the light-emitting layer b of the first sub-pixel sp1. That is, the light-emitting region F corresponds to the light-emitting layer b. FIG. 2 illustrates a case where one light-shielding structure Z overlaps the light-emitting region F of one first sub-pixel sp1. In other alternative embodiments, one light-shielding structure may overlap light-emitting regions of two or three first sub-pixels. The number of the light-emitting regions that overlap one and the same light-shielding structure can be set according to design requirements. In this embodiment of the present disclosure, a shape of the light-emitting region of the first sub-pixel is not limited, and may be the same as or different from the shape of the light-shielding structure. As shown in FIG. 3, the display panel further includes an encapsulation layer 103 and a cover plate 104. The encapsulation layer 103 is configured to protect the light-emitting layers in the sub-pixels from water and oxygen. In an embodiment, the encapsulation layer 103 includes at least one organic encapsulation layer and at least one inorganic encapsulation layer. In an embodiment, a touch structure layer (not shown in the figure) is further provided between the encapsulation layer 103 and the cover plate 104, and is configured to implement a touch function of the display panel.

The light-shielding structure defined in the embodiments of the present disclosure refers to a structure that can shield light. In other words, when combined with the design with the under-screen optical device, light cannot pass through the light-shielding structure to be utilized by the optical device. In an embodiment, the light-shielding structure is a structure layer additionally added in the first display region. In order to achieve normal light-emitting display of the first display region, as shown in FIG. 3, the light-shielding structure Z is located at a side of the light-emitting layer b of the first sub-pixel sp1 close to the base substrate 101. For example, the anode of the first sub-pixel is a reflective anode, and light emitted from the light-emitting layer towards the anode can be reflected by the anode and then outputted from the cathode, so that light output efficiency of the first sub-pixel can be improved. Alternatively, the anode of the first sub-pixel is reused as the light-shielding structure, which will be described in the following embodiments.

With further reference to FIG. 2, the light-shielding structure array includes at least one light-shielding structure group ZZ, and the light-shielding structure group ZZ includes a main light-shielding structure Za and at least one auxiliary light-shielding structure Zb (two auxiliary light-shielding structures Zb are illustrated in the figure). An orthographic projection of the main light-shielding structure Za onto the base substrate 101 is referred to as a main projection Ya, and an orthographic projection of the auxiliary light-shielding structure Zb onto the base substrate 101 is referred to as an auxiliary projection Yb. The main projection Ya and the auxiliary projection Yb have the same shape. That is, orthographic projections of all light-shielding structures Z in the same light-shielding structure group ZZ onto the base substrate have the same shape. FIG. 2 is a schematic top view, which has a viewing direction that is the same as a projecting direction of the light-shielding structure onto the base substrate. When viewed from the top, the main light-shielding structure Za overlaps the main projection Ya, and the auxiliary light-shielding structure Zb overlaps the auxiliary projection Yb. In this embodiment of the present disclosure, the shape of the projection of the light-shielding structure may be an arbitrary polygon, such as a triangle, a quadrangle, a pentagon, a hexagon, etc. FIG. 2 illustrates a case where the shape of the orthographic projection of the light-shielding structure is square as an example. However, in the light-shielding structure array, the orthographic projections of the light-shielding structures onto the base substrate may have different shapes. That is, an orthographic projection of a light-shielding structure in one light-shielding structure group onto the base substrate may have a different shape from an orthographic projection of a light-shielding structure in another light-shielding structure group onto the base substrate.

It should be understood that the main light-shielding structure and the auxiliary light-shielding structure defined in this embodiment of the present disclosure are two relative concepts, which refer to different light-shielding structures in the same light-shielding structure group. That is, in the same light-shielding structure group, one of the light-shielding structures is regarded as the main light-shielding structure, then each of the remaining light-shielding structures will be an auxiliary light-shielding structure relative to the main light-shielding structure. Each light-shielding structure group includes only one main light-shielding structure, but two or more auxiliary light-shielding structures. Similarly, the main projection and the auxiliary projection are also two relative concepts, and they refer to orthographic projections of two light-shielding structures in the same light-shielding structure group on the base substrate, respectively.

The simplified schematic diagram in FIG. 4 illustrates the main projection Ya and one auxiliary projection Yb. For example, the shape of the projection is a square. The main projection Ya includes a main vertex angle ∠A, and a vertex of the main vertex angle ∠A is A. The auxiliary projection Yb includes an auxiliary vertex angle ∠B, and a vertex of the auxiliary vertex angle ∠B is B. The main vertex angle ∠A and the auxiliary vertex angle ∠B are corresponding angles relative to each other. Definition of the corresponding angle can refer to that in geometric mathematics. For two patterns that are congruent with each other or similar to each other, correspondingly equal angles and their vertices are their corresponding angles and corresponding vertices. The edge between two corresponding angles are a corresponding edge, and the corresponding edge can also be defined by an edge connecting two corresponding vertices. It should be further noted that, in this embodiment of the present disclosure, the main projection and the auxiliary projection have the same shape, but may have the same area or different areas. In other words, the main projection may be congruent with the auxiliary projection, or similar to the auxiliary projection.

A main vector i is formed by a gravity center $O_a$ of the main projection Ya as a starting point and the main vertex angle ∠A as an end point, and the main vector i is denoted by $\overrightarrow{O_aA}$. In an auxiliary projection Yb, an auxiliary vector j is formed by a gravity center $O_b$ of the auxiliary projection Yb as a starting point and the auxiliary vertex angle ∠B as an end point, and the auxiliary vector j is denoted by $\overrightarrow{O_bB}$. In the figure, both the main vector i and the auxiliary vector j are illustrated by bold solid lines. It can be seen from FIG. 4 that a direction of the main vector $\overrightarrow{O_aA}$ is different from a direction of the auxiliary vector $\overrightarrow{O_bB}$. The concept of gravity center can be understood by referring to a gravity center of an object. For a regular polygon, the gravity center coincides with the geometric center. For an irregular polygon, a suspension method can be used to determine the gravity center. For example, an object (for example, a thin plate) having the same shape as the irregular polygon and having a uniform density can be used for a suspension test, in which the object is suspended at a point by a rope, then a gravity line is drawn after the object is stationary. Similarly, the object is suspended at another point by a rope, then another gravity line is drawn after the object is stationary. Then, an intersection point of the two gravity lines is the gravity center of the object. A position of the gravity center of the irregular pattern of the test object is the same as a position of the gravity center of the tested object.

The shape of the main projection Ya is the same as the shape of the auxiliary projection Yb, but the direction of the main vector $\overrightarrow{O_aA}$ is different from the direction of the auxiliary vector $\overrightarrow{O_bB}$. It can be seen from the figure that the shape of the auxiliary projection Yb is equivalent to a shape obtained by rotating the shape of the main projection Ya by a certain angle in a plane where the projections are located. When the display panel is viewed from the top, the main light-shielding structure Za overlaps the main projection Ya, and the auxiliary light-shielding structure Zb overlaps the auxiliary projection Yb. That is, the shape of the auxiliary light-shielding structure Zb is the same as the shape of the main light-shielding structure Za, the auxiliary light-shielding structure Zb can be regarded as a structure obtained by rotating the main light-shielding structure Za by a certain angle in a plane where the light-shielding structures are located. In other words, although the auxiliary light-shielding structure Zb and the main light-shielding structure Za have the same shape, when viewed from the top at the same viewing angle, the corresponding angles (∠B and ∠A) of the auxiliary light-shielding structure Zb and the main light-shielding structure Za are oriented differently. For light-shielding structures having a regular shape, when viewed from the top at the same viewing angle, any corresponding edges (the edges marked by // in FIG. 4) of the auxiliary light-shielding structure and the main light-shielding structure extend in different directions. For light-shielding structures having an irregular shape, when viewed from the top at the same viewing angle, the corresponding edges of the auxiliary light-shielding structure and the main light-shielding structure may extend partially in the same direction. In this case, the auxiliary light-shielding structure can still be regarded as a structure obtained by rotating the main light-shielding structure by a certain angle in a plane where the light-shielding structures are rotated.

Taking FIG. 4 as an example, when an area of the main light-shielding structure Za is the same as an area of the auxiliary light-shielding structure Zb, the main light-shielding structure Za rotates about its gravity center by an angle in a plane of the paper, and then moves to a position of the auxiliary light-shielding structure Zb along a direction e shown in the figure to completely overlap the auxiliary light-shielding structure Zb.

Figure 5:
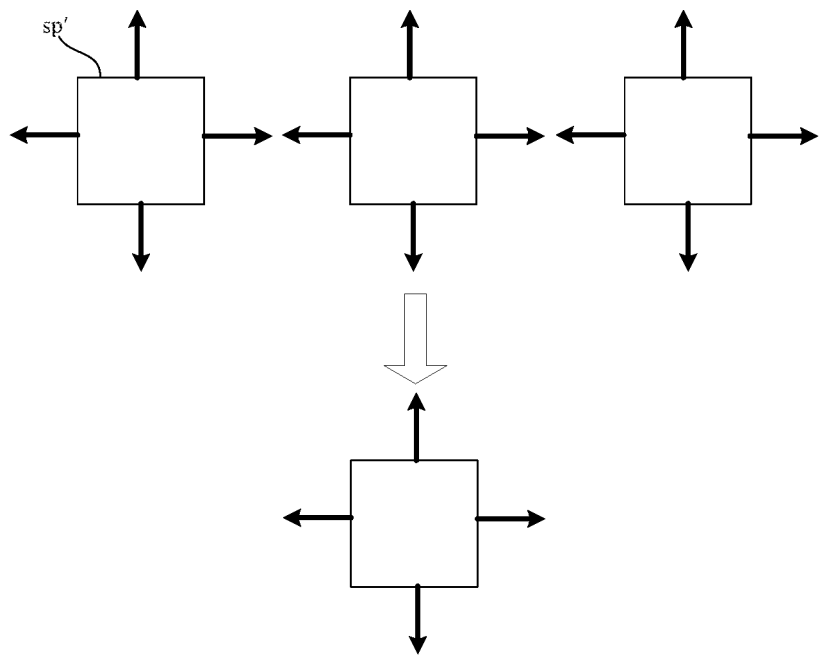
FIG. 5 is a schematic diagram of a principle of light diffraction in the related art.
Figure 6:
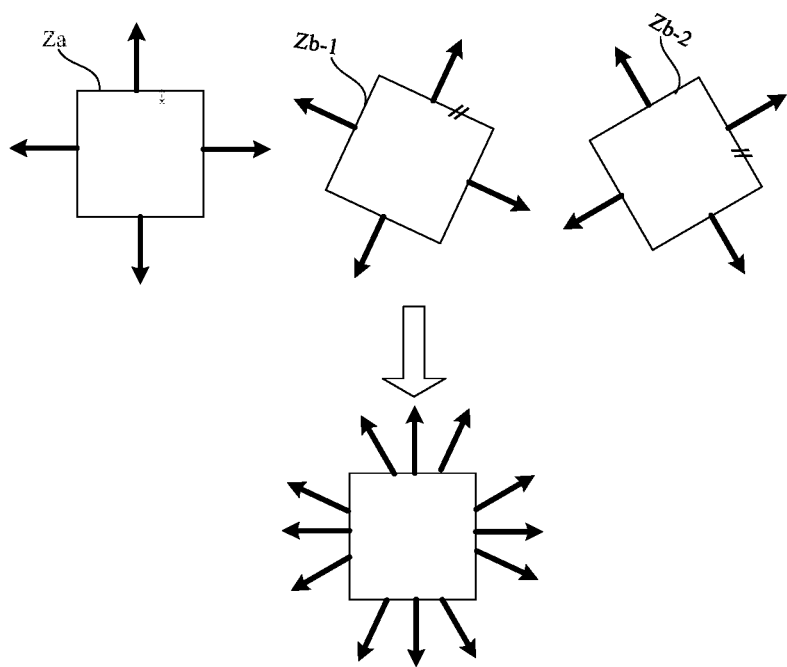
FIG. 6 is a schematic diagram of a principle of light diffraction around a light-shielding structure according to an embodiment of the present disclosure.

FIG. 5 is a schematic diagram of a principle of light diffraction in the related art. FIG. 6 is a schematic diagram of a principle of light diffraction around a light-shielding structure according to an embodiment of the present disclosure.

As shown in FIG. 5, a light-shielding structure in the related art is mainly a sub-pixel sp', and the sub-pixels sp' are regularly arranged in the display panel. Taking the shape of the sub-pixel sp' as a square, for example, when light passes through the display panel, light diffraction occurs in four normal directions of four edges of the sub-pixel sp'. Regarding the sub-pixel sp' as a light-shielding structure without thickness, the normal direction of an edge is a direction perpendicular to the edge in a plane where the sub-pixel sp' is located. When light passes through the display panel in the related art, light diffraction occurs mainly in the four normal directions.

As shown in FIG. 6, taking the light-shielding structure Z in this embodiment of the present disclosure and the sub-pixel sp' in the related art having the same shape as an example, the main light-shielding structure Za rotates by a certain angle in the plane where the light-shielding structure is located to obtain the pattern of the auxiliary light-shielding structure Zb. In the figure, the main light-shielding structure Za rotates clockwise by 30° to obtain the pattern of the auxiliary light-shielding structure Zb-1, the main light-shielding structure Za rotates clockwise by 60° to obtain the pattern of another auxiliary light-shielding structure Zb-2, and the main light-shielding structure Za rotates by 90° to coincide with its original pattern. It can be seen that, when viewed from the top at a same viewing angle, the corresponding edges (the edges marked by // in the figure) of the main light-shielding structure Za and auxiliary light-shielding structures Zb extend in different directions, then light diffraction occurring around the corresponding edges has different diffraction directions. When light passes through the display panel provided by this embodiment of the present disclosure, light diffraction occurs in the normal directions of the edges of the light-shielding structure, and light diffraction occurs in twelve directions in total. It can be seen that directions of light diffraction around the main light-shielding structure are different from directions of light diffraction around the auxiliary light-shielding structure. With this design, light diffraction around the light-shielding structures occurs in more directions, and light diffraction in each direction has a weaker diffraction intensity, alleviating a light diffraction phenomenon and improving the imaging quality of the under-screen optical device.

In this embodiment of the present disclosure, the light-shielding structure group includes n auxiliary light-shielding structures, where n≥2 and n is an integer. That is, one light-shielding structure group may include two or more auxiliary light-shielding structures, and the auxiliary light-shielding structures are patterns obtained by rotating the main light-shielding structure by different angles in the plane where the main light-shielding structure is located. Some exemplary arrangement manners of the light-shielding structures in the light-shielding structure group will be illustrated below in the embodiments of the present disclosure. When viewed from the top, each light-shielding structure overlaps an orthographic projection of the light-shielding structure onto the base substrate. Therefore, unless necessary, the orthographic projection of the light-shielding structure will no longer be marked in the figures corresponding to the following embodiments. In addition, in the following embodiments, in the same light-shielding structure group, the main vector corresponding to the main light-shielding structure is denoted by i, and the auxiliary vector corresponding to the auxiliary light-shielding structure is denoted by j. In the figures corresponding to the following embodiments, a bold arrow represents a corresponding direction of a vector.

Figure 7:
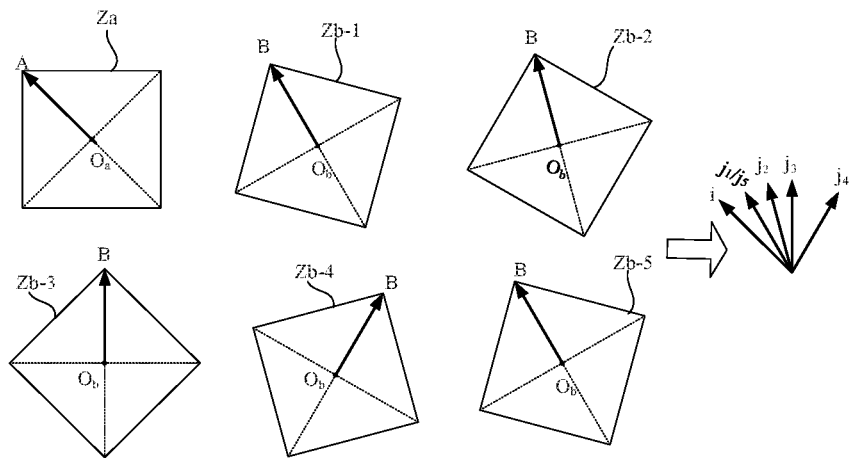
FIG. 7 is a schematic diagram of light-shielding structures in a light-shielding structure group according to an embodiment of the present disclosure.

FIG. 7 is a schematic diagram of light-shielding structures in a light-shielding structure group according to an embodiment of the present disclosure. As shown in FIG. 7, for example, the shape of the light-shielding structure Z is a square. FIG. 7 schematically illustrates the patterns of the light-shielding structures in the light-shielding structure group, which does not indicate an actual arrangement manner of the light-shielding structures in the light-shielding structure group in the display panel. FIG. 7 illustrates the main light-shielding structure Za and the main vector i that is formed by a gravity center $O_a$ as a starting point and a vertex A of the main vertex angle ∠A as an end point. Taking n=5 as an example, FIG. 7 illustrates five auxiliary light-shielding structures Zb and the vertexes B of the respective auxiliary vertex angles ∠B, and each auxiliary light-shielding structure Zb corresponds to a respective auxiliary vector. The five auxiliary light-shielding structures are denoted by Zb-1, Zb-2, Zb-3, Zb-4, and Zb-5, and the corresponding auxiliary vectors are denoted by $j_1$, $j_2$, $j_3$, $j_4$, and $j_5$. It can be seen that each of the directions of the five auxiliary vectors corresponding to the five auxiliary light-shielding structures Zb is different from the direction of the main vector, and among the five auxiliary light-shielding structures, the directions of the auxiliary vectors corresponding to two auxiliary light-shielding structure Zb-1, Zb-5 are the same. That is, in some embodiments, one light-shielding structure group may include auxiliary light-shielding structures that correspond to auxiliary vectors having the same direction. In the first display region of the display panel, relative positions between the auxiliary light-shielding structures and the main light-shielding structure in the light-shielding structure group are arranged and designed, in such a manner that when light passes through the light-shielding structure group, light diffraction around the light-shielding structures occurs in more directions, and light diffraction in each direction has a weaker intensity, alleviating the light diffraction phenomenon and improving the imaging quality of the under-screen optical device.

Figure 8:
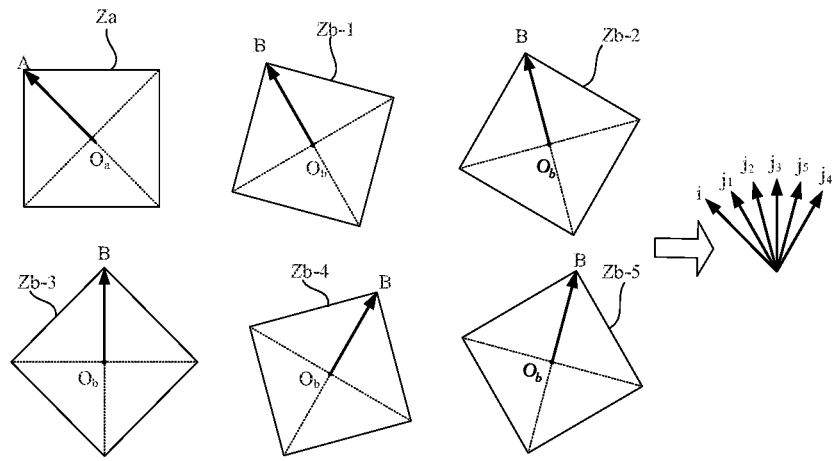
FIG. 8 is another schematic diagram of light-shielding structures in a light-shielding structure group according to an embodiment of the present disclosure.

FIG. 8 is another schematic diagram of light-shielding structures in a light-shielding structure group according to an embodiment of the present disclosure. As shown in FIG. 8, the main light-shielding structure Za and five auxiliary light-shielding structures Zb are illustrated, and the five auxiliary light-shielding structures are denoted by Zb-1, Zb-2, Zb-3, Zb-4, and Zb-5, and the corresponding auxiliary vectors are denoted by $j_1$, $j_2$, $j_3$, $j_4$, and $j_5$. The direction of each of the five auxiliary vectors corresponding to the five auxiliary light-shielding structures Zb is different from the direction of the main vector i, and the directions of the auxiliary vectors corresponding to any two of the five auxiliary light-shielding structures Zb are different from each other. FIG. 8 schematically illustrates the patterns of the light-shielding structures in the light-shielding structure group, which does not indicate an actual arrangement manner of the light-shielding structures in the light-shielding structure group in the display panel. In this embodiment, for any two auxiliary light-shielding structures, the corresponding vertexes are oriented differently from each other, and the directions along which the corresponding edges extend are also different from each other, so that the directions of light diffraction around the corresponding edges of the auxiliary light-shielding structures are different from each other. In the first display region of the display panel, relative positions between the auxiliary light-shielding structures and the main light-shielding structure in the light-shielding structure group are arranged and designed, in such a manner that when light passes through the light-shielding structure group, light diffraction around different light-shielding structures occurs in different directions, so that light diffraction occurs in more directions, and light diffraction in each direction has a weaker intensity, alleviating a light diffraction phenomenon and improving the imaging quality of the under-screen optical device.

An included angle between the auxiliary vector and the main vector is a rotation angle corresponding to the auxiliary light-shielding structure corresponding to the auxiliary vector. According to a definition of an included angle between vectors in mathematics, an included angle between two vectors ranges from 0° to π, including endpoint values. In this embodiment of the present disclosure, the direction of the auxiliary vector is different from the direction of the main vector, so an included angle between the auxiliary vector and the main vector is larger than 0° and smaller than or equal to π. That is, in this embodiment of the present disclosure, the rotation angle is larger than 0° and smaller than or equal to π. A relationship between the direction of the main vector and the direction of the auxiliary vector satisfies: after the main vector rotates by an angle that is the same as the rotation angle, the direction of the main vector will be the same as the direction of the auxiliary vector. A relationship between the main light-shielding structure and the auxiliary light-shielding structure satisfies: after the main light-shielding structure rotates by an angle that is the same as the rotation angle in the plane where the main light-shielding structure is located, the corresponding angles of the main light-shielding structure and the auxiliary light-shielding structure are oriented identically.

Further, in this embodiment of the present disclosure, the rotation angle is also related to the shape of the light-shielding structure. In an embodiment, the shape of the light-shielding structure is a regular polygon, such as an equilateral triangle. After rotating by 120° about the gravity center in the plane where the main light-shielding structure is located, the pattern of the main light-shielding structure having the shape of an equilateral triangle will coincides with the original pattern of the main light-shielding structure. Since the direction of the auxiliary vector is different from the direction of the main vector, the included angle between the auxiliary vector and the main vector is smaller than 120°, that is, the rotation angle is smaller than 120°. In another embodiment, the shape of the light-shielding structure is an irregular polygon. For example, the pattern of the main light-shielding structure will coincide with the original pattern of the main light-shielding structure after rotating by 360° about the gravity center in the plane where the main light-shielding structure is located. In this case, the angle between the auxiliary vector and the main vector is smaller than or equal to 180°, that is, the rotation angle is smaller than or equal to 180°.

With further reference to FIG. 8, in one light-shielding structure group, taking n=5 as an example, the five auxiliary light-shielding structures correspond to five rotation angles different from each other. That is, the five auxiliary light-shielding structures Zb-1, Zb-2, Zb-3, Zb-4, and Zb-5 correspond to the auxiliary vectors $j_1$, $j_2$, $j_3$, $j_4$, and $j_5$, and each of the five auxiliary vectors and the main vector i form a respective rotation angle. In this embodiment, the five rotation angles are different from each other, that is, the five auxiliary light-shielding structures can be obtained by rotating the main light-shielding structure by five different angles in the plane where the main light-shielding structure is located. In this embodiment, each auxiliary light-shielding structure can be regarded as a structure obtained by rotating the main light-shielding structure by a different angle, and the corresponding edges of the auxiliary light-shielding structures extend in different directions. Therefore, light diffraction around the corresponding edges of the auxiliary light-shielding structures occurs in different directions. When light passes through the light-shielding structure group, light diffraction around each light-shielding structure occurs in a different direction, increasing directions of light diffraction and decreasing the intensity of light diffraction in each direction, and thus alleviating the light diffraction phenomenon. In addition, when designing, the rotation angle (the value of the rotation angle) can be designed to adjust the directions of light diffraction around the light-shielding structures. FIG. 8 illustrates an embodiment in which the shape of the light-shielding structure is a regular polygon. This implementation manner is also applicable to the case where the shape of the light-shielding structure is irregular.

Figure 9:
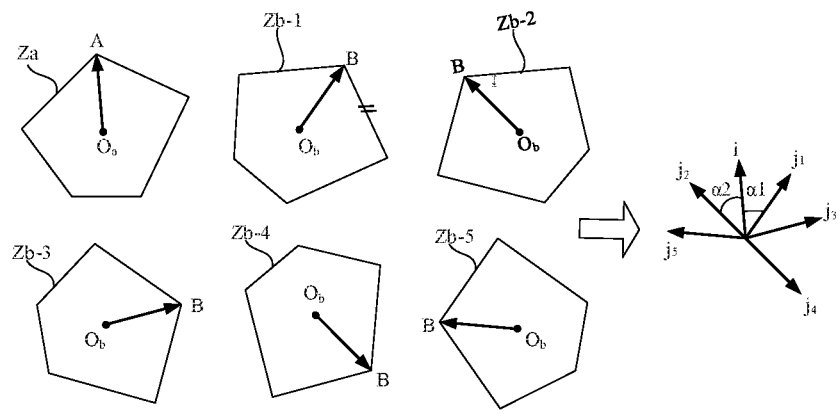
FIG. 9 is another schematic diagram of light-shielding structures in a light-shielding structure group according to an embodiment of the present disclosure.

FIG. 9 is another schematic diagram of light-shielding structures in a light-shielding structure group according to an embodiment of the present disclosure. In an embodiment, as shown in FIG. 9, one main light-shielding structure Za and five auxiliary light-shielding structures Zb-1, Zb-2, Zb-3, Zb-4, and Zb-5 are illustrated. The directions of the five auxiliary vectors ($j_1$, $j_2$, $j_3$, $j_4$, $j_5$) corresponding to the five auxiliary light-shielding structures are all different from the direction of the main vector i, and the directions of the auxiliary vectors corresponding to any two of the five auxiliary light-shielding structures Zb are different from each other. The light-shielding structure group includes the first auxiliary light-shielding structure Zb-1 and the second auxiliary light-shielding structure Zb-2, and the rotation angle $\alpha 1$ of the first auxiliary light-shielding structure Zb-1 and the rotation angle $\alpha 2$ of the second auxiliary light-shielding structure Zb-2 have the same value. That is, the included angle between the auxiliary vector $j_1$ corresponding to the first auxiliary light-shielding structure Zb-1 and the main vector i is equal to the included angle between the auxiliary vector $j_2$ corresponding to the second auxiliary light-shielding structure Zb-2 and main vector i. It will be understood that the pattern of the first auxiliary light-shielding structure Zb-1 is equivalent to a pattern of the main light-shielding structure Za after the main light-shielding structure Za is rotated clockwise by an angle $\alpha 1$ in the plane where the main light-shielding structure Za is located, and the pattern of the second auxiliary light-shielding structure Zb-2 is equivalent to a pattern of the main light-shielding structure Za after the main light-shielding structure Za is rotated counterclockwise by an angle $\alpha 2$ in the plane where the main light-shielding structure Za is located, where $\alpha 1=\alpha 2$. It will also be understood as that the pattern of the first auxiliary light-shielding structure Zb-1 is the same as a pattern of the main light-shielding structure Za obtained after the main light-shielding structure Za is rotated clockwise by an angle $\alpha 1$ in the plane where the main light-shielding structure Za is located, and the pattern of the second auxiliary light-shielding structure Zb-2 is the same as a pattern of the main light-shielding structure Za obtained after the main light-shielding structure Za is rotated clockwise by an angle $(360°-\alpha 1)$ in the plane where the main light-shielding structure Za is located. When this implementation is applied to a display panel including light-shielding structures having an irregular shape, the first auxiliary light-shielding structure and the second auxiliary light-shielding structure are equivalent to light-shielding structures obtained after the main light-shielding structure is rotated to different extents, and directions of auxiliary vectors corresponding to the first auxiliary light-shielding structure and the second auxiliary light-shielding structure are different from each other, but the included angles between the two auxiliary vectors and the main vector are equal to each other. In this case, some corresponding edges of the first auxiliary light-shielding structure and the second auxiliary light-shielding structure (e.g., a group of corresponding edges marked by // in the figure) extend in different directions, and light diffraction around the corresponding edges, extending in different directions, of the first auxiliary light-shielding structure and the second auxiliary light-shielding structure occurs in different directions, which can also increase directions of light diffraction to a certain extent and decrease the intensity of light diffraction in each diffraction direction, alleviating the light diffraction phenomenon and improving the imaging quality of the under-screen optical device.

Figure 10:
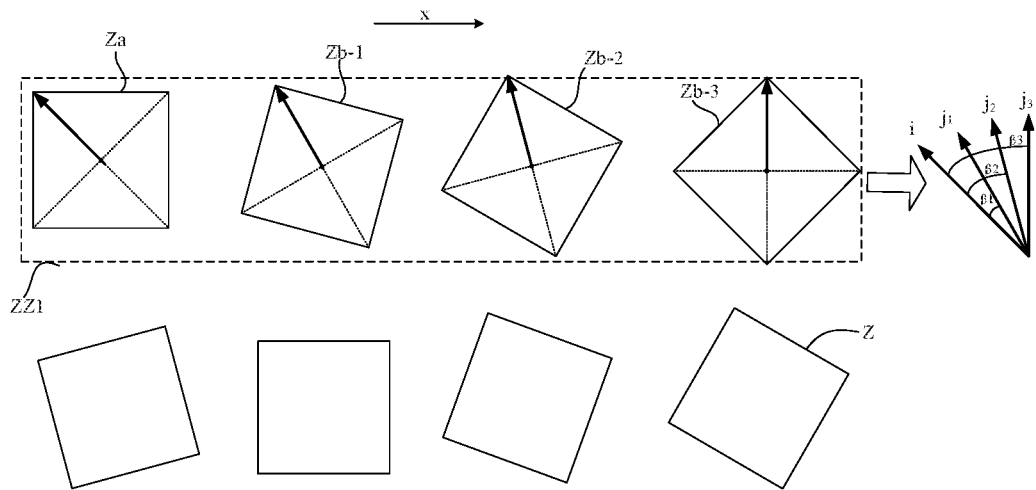
FIG. 10 is a schematic diagram of an arrangement of a light-shielding structure group in a first display region according to an embodiment of the present disclosure.

FIG. 10 is a schematic diagram of an arrangement of a light-shielding structure group in the first display region according to an embodiment of the present disclosure. As shown in FIG. 10, the at least one light-shielding structure group includes a first light-shielding structure group ZZ1. Still taking the shape of the light-shielding structure as a square as an example, in the first light-shielding structure group ZZ1, the main light-shielding structure Za and three (i.e., n=3) auxiliary light-shielding structures Zb are arranged along a first direction x, and the three auxiliary light-shielding structures are denoted by Zb-1, Zb-2, and Zb-3. The main vector corresponding to the main light-shielding structure Za is denoted by i, and the auxiliary vectors corresponding to the three auxiliary light-shielding structures Zb-1, Zb-2, and Zb-3 are denoted by $j_1$, $j_2$, and $j_3$. As shown in the figure, an included angle between the auxiliary vector $j_1$ and the main vector i is $\beta 1$, an included angle between the auxiliary vector $j_2$ and the main vector i is $\beta 2$, and an included angle between the auxiliary vector $j_3$ and the main vector i is $\beta 3$, where $\beta 1 \beta 2 \beta 3$. That is, the included angles between the main vector and the auxiliary vectors corresponding to the three auxiliary light-shielding structures Zb arranged along the first direction x gradually increase. The included angle between the auxiliary vector and the main vector is defined as a rotation angle. Then in the first light-shielding structure group ZZ1, the rotation angles corresponding to the three auxiliary light-shielding structures Zb arranged along the first direction x gradually increase. In another embodiment, it is also possible that the rotation angles corresponding to n auxiliary light-shielding structures Zb arranged along the first direction x gradually decrease. In this implementation manner, the light-shielding structures in the same light-shielding structure group are arranged in the same direction, along which the included angles between the auxiliary vectors corresponding to the auxiliary light-shielding structures and the main vector corresponding to the main light-shielding structure gradually change. In this way, directions of light diffraction around the light-shielding structures can be increased. Meanwhile, the light-shielding structures in the light-shielding structure group have a certain regularity, in such a manner that complexity of the arrangement of the light-shielding structures is reduced and process difficulty for the light-shielding structures is thus reduced.

Figure 11:
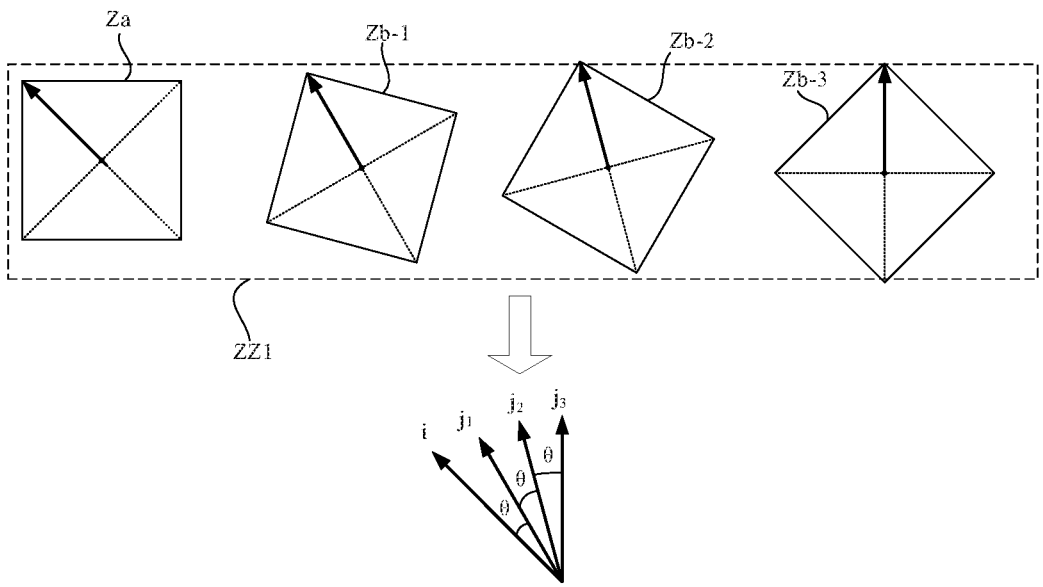
FIG. 11 is a schematic diagram of another arrangement of a light-shielding structure group in a first display region according to an embodiment of the present disclosure.

FIG. 11 is a schematic diagram of another arrangement of a light-shielding structure group in the first display region according to an embodiment of the present disclosure. As shown in FIG. 11, in the first light-shielding structure group ZZ1: taking n=3 as an example, the main light-shielding structure Za and three auxiliary light-shielding structures Zb are arranged along the first direction x, and the three auxiliary light-shielding structures are denoted by Zb-1, Zb-2, and Zb-3. The main vector corresponding to the main light-shielding structure Za is denoted by i, and the auxiliary vectors corresponding to the three auxiliary light-shielding structures Zb-1, Zb-2, and Zb-3 are denoted by $j_1$, $j_2$, and $j_3$. As shown in the figure, for example, the rotation angles corresponding to the three auxiliary light-shielding structures Zb arranged along the first direction x gradually increase. In this case, the smallest one of the rotation angles corresponding to the three auxiliary light-shielding structures Zb is θ, and an included angle between two auxiliary vectors j corresponding to two adjacent auxiliary light-shielding structures Zb is equal to θ. In this implementation, the light-shielding structures in the same light-shielding structure group are arranged in the same direction, along which the included angles between the auxiliary vectors corresponding to the auxiliary light-shielding structures and the main vector corresponding to the main light-shielding structure gradually change. In this implementation, it is equivalent to that, in the arrangement direction of the light-shielding structures, a pattern of each light-shielding structure obtained after the light-shielding structure is rotated about the gravity center of the light-shielding structure along a same direction by an angle θ in the plane where the light-shielding structure is located is the same as the pattern of a light-shielding structure adjacent thereto. Similarly, directions obtained after the directions of light diffraction around each light-shielding structure are rotated by an angle θ in the plane where the light-shielding structure is located are the same as the directions of light diffraction around a light-shielding structure adjacent thereto. When light passes through the light-shielding structure group, the directions of light diffraction around the light-shielding structures are superimposed, increasing directions of light diffraction around the light-shielding structures and thus facilitating uniform dispersion of light diffraction around the light-shielding structures to alleviate the light diffraction phenomenon. In addition, the light-shielding structures in the light-shielding structure group are regularly arranged, decreasing complexity of the arrangement of the light-shielding structures and thus decreasing process difficulty for the light-shielding structures.

In some embodiments, the shape of the main projection corresponding to the main light-shielding structure is a regular polygon. That is, in the plane where the main light-shielding structure is located, the shape of the main light-shielding structure is a regular polygon, such as the regular quadrangle as shown in FIG. 10 or FIG. 11, a regular pentagon, a regular hexagon, or a regular pentagram. The shape of the light-shielding structure being a regular polygon is beneficial to decrease the process difficulty for manufacturing the light-shielding structure array, and is beneficial to uniform dispersion of light diffraction around the light-shielding structures. In addition, the light-emitting region of the sub-pixel is usually a regular pattern (such as a rectangle or a circle), so the shape of the light-shielding structure being designed to a regular polygon is beneficial to allow the shape of the light-emitting region of the sub-pixel to match the shape of the shielding structure, achieving a minimized area of the individual light-shielding structure. In this way, light transmittance of the first display region can be satisfactory, that is, a sufficient amount of light can be received by the optical device in the design with the under-screen optical device.

Further, the main projection is a regular polygon having m edges, where m≥3 and m is an integer, and $$\theta \le \frac{360°}{m*(n+1)}.$$

Taking m=4 as an example, when n=2, θ≤30°. That is, one light-shielding structure group includes one main light-shielding structure and two auxiliary light-shielding structures, the shape of the light-shielding structure is a regular quadrangle, and the one main light-shielding structure and the two auxiliary light-shielding structures are arranged in the same direction. When viewed from the top at the same viewing angle, the patterns of the two auxiliary light-shielding structures are the same as patterns of the main light-shielding structure obtained after the main light-shielding structure is rotated by different angles in the plane where the main light-shielding structure is located, and in the arrangement direction, a difference between the rotation angles corresponding to two adjacent auxiliary light-shielding structures is θ. When θ=30°, the pattern of a first auxiliary light-shielding structure is the same as a pattern of the main light-shielding structure obtained after the main light-shielding structure is rotated clockwise by 30°, the pattern of a second auxiliary light-shielding structure is the same as a pattern of the main light-shielding structure obtained after the main light-shielding structure is rotated clockwise by 60°, and a pattern of the main light-shielding structure obtained after the main light-shielding structure is rotated clockwise by 90° coincides with the original pattern of the main light-shielding structure. This implementation can achieve that, when viewed from the top at the same viewing angle, corresponding angles of any two light-shielding structures in the light-shielding structure group are oriented differently from each other, and corresponding edges thereof extend in different directions, so that light diffraction can be dispersed around the light-shielding structures to alleviate the light diffraction phenomenon. Moreover, when $$\theta = \frac{360°}{m*(n+1)},$$

diffracted light can be uniformly dispersed around the light-shielding structures, and light diffraction has substantially the same intensity in each direction. Therefore, the light diffraction phenomenon can be alleviated to a greater extent, improving the imaging quality of the under-screen optical device.

FIG. 10 or FIG. 11 illustrates a case where the shape of the light-shielding structure is a regular polygon, however, the embodiment corresponding to FIG. 10 or FIG. 11 is also applicable to a case where the shape of the light-shielding structure is an irregular polygon, such as the pentagon as shown in FIG. 5, a triangle, hexagon, or the like. For the light-shielding structure having a shape that is an irregular polygon, generally, the light-shielding structure needs to be rotated by 360° in the plane where the light-shielding structure is located to coincide with the light-shielding structure itself. But for some irregular polygons, which are not regular polygons but include multiple pairs of mutually parallel edges, such as the shape of the light-shielding structure shown in FIG. 12, the light-shielding structure can coincide with the light-shielding structure itself after being rotated by 180°.

Figure 12:
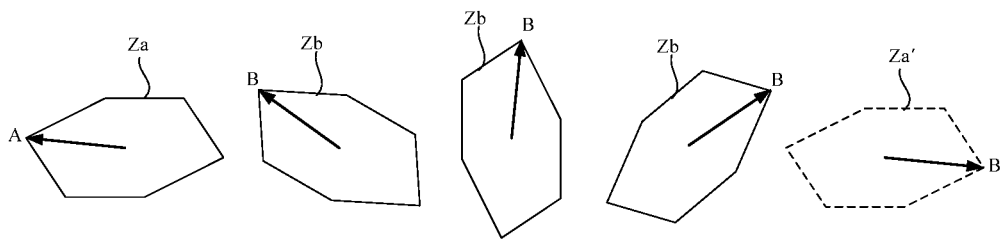
FIG. 12 is another schematic diagram of a light-shielding structure according to an embodiment of the present disclosure.

FIG. 12 is another schematic diagram of light-shielding structures according to an embodiment of the present disclosure. As shown in FIG. 12, the shape of the light-shielding structure is a hexagon. The auxiliary light-shielding structures Zb can be obtained by rotating the main light-shielding structure Za clockwise by different angles in the plane of the paper, and the pattern Za' obtained after the main light-shielding structure Za is rotated by 180° coincides with the original pattern of the main light-shielding structure Za. When the shape of the light-shielding structure is an irregular polygon, and one light-shielding structure group includes one main light-shielding structure and n auxiliary light-shielding structures, the one main light-shielding structure and the n auxiliary light-shielding structures in the light-shielding structure group are arranged in the same direction. When viewed from the top at the same viewing angle, the n auxiliary light-shielding structures are all equivalent to being obtained by rotating the main light-shielding structure by different angles in the plane where the main light-shielding structure is located. Further, in the arrangement direction, a difference between the rotation angles corresponding to every two adjacent auxiliary light-shielding structures is identical. In this way, it can also achieve dispersion of diffracted light around the light-shielding structures, to alleviate the light diffraction phenomenon.

In an embodiment, p first light-shielding structure groups are arranged in a second direction to form a first repeated unit, and the second direction intersects with the first direction, where p≥2 and p is an integer. In the light-shielding structure array, a plurality of first repeated units are periodically arranged. A case where p=4 will be illustrated below for example.

Figure 13:
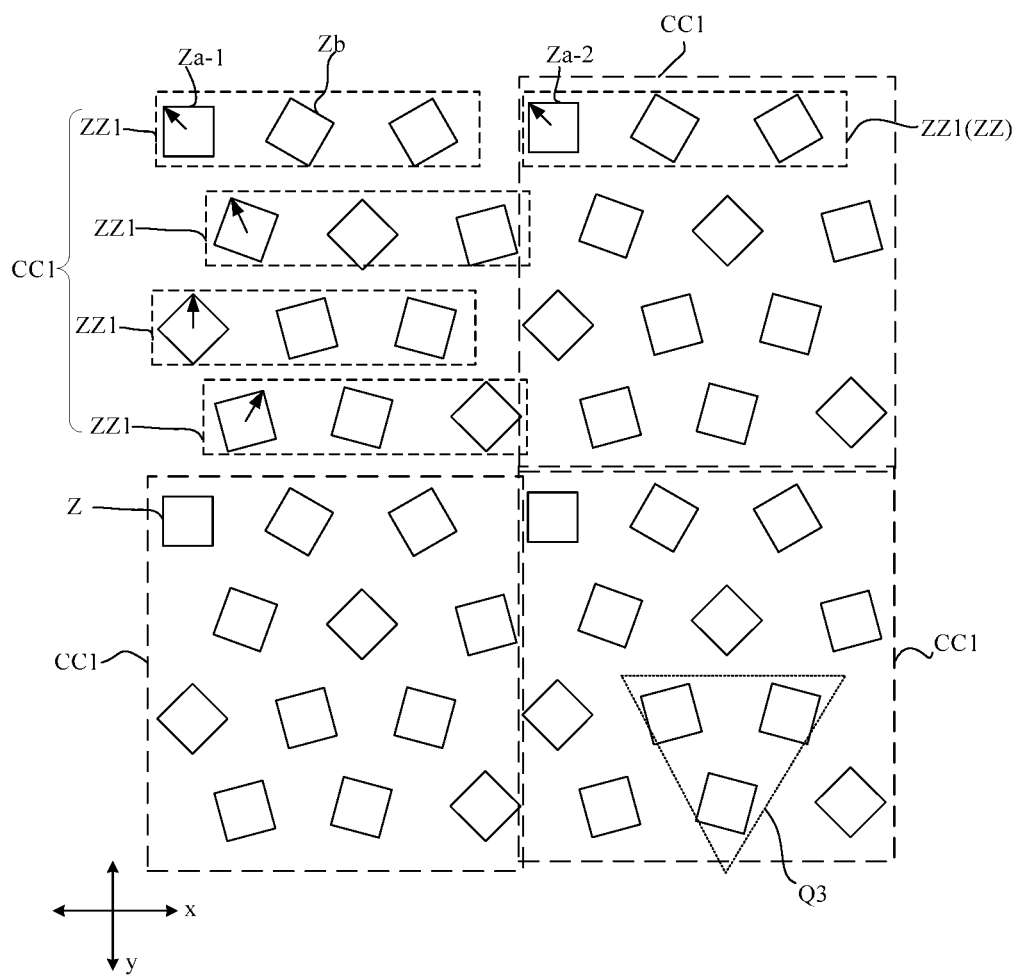
FIG. 13 is a schematic diagram of an arrangement of light-shielding structures in a first display region according to an embodiment of the present disclosure.

FIG. 13 is a schematic diagram of an arrangement of light-shielding structures in the first display region according to an embodiment of the present disclosure. As shown in FIG. 13, four first light-shielding structure groups ZZ1 are arranged in the second direction y to form one first repeated unit CC1. The second direction y intersects with the first direction x. In the light-shielding structure array, a plurality of first repeated units CC1 are periodically arranged. The figure schematically illustrates four first repeated units CC1 in the light-shielding structure array. In this embodiment, the light-shielding structures Z in the light-shielding structure array are arranged in a staggered manner. For two adjacent first light-shielding structure groups ZZ1 arranged in the second direction y, the two first light-shielding structure groups ZZ1 are staggered relative to each other in the second direction y, and the light-shielding structures Z, corresponding to each other, in the light-shielding structure groups are not aligned with each other in the second direction y. Two adjacent light-shielding structures in one first light-shielding structure group that are arranged in the first direction x and one light-shielding structure in another first light-shielding structure group form three vertices of a triangle (for example, an area Q3 marked in the figure).

Figure 14:
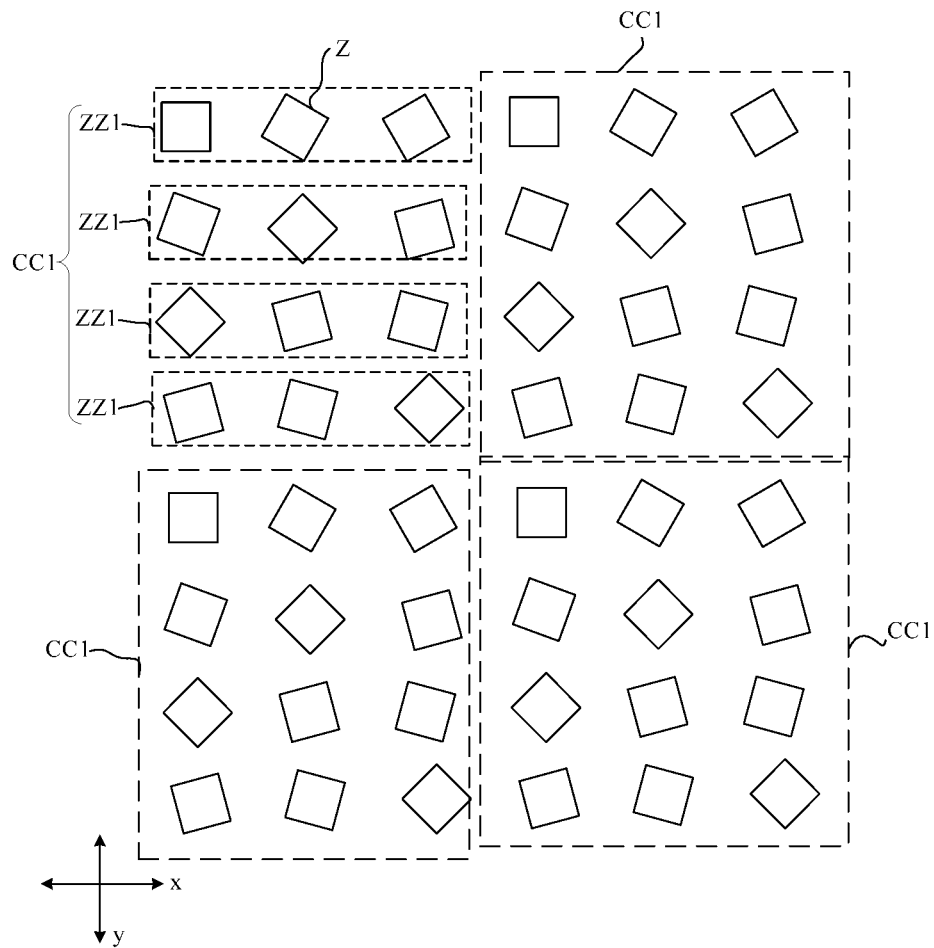
FIG. 14 is a schematic diagram of another arrangement of light-shielding structure in a first display region according to an embodiment of the present disclosure.

FIG. 14 is a schematic diagram of another arrangement of light-shielding structures in the first display region according to an embodiment of the present disclosure. As shown in FIG. 14, four first light-shielding structure groups ZZ1 are arranged in the second direction y to form one first repeated unit CC1. The second direction y intersects with the first direction x. In the light-shielding structure array, a plurality of first repeated units CC1 are periodically arranged. The figure illustrates four first repeated units CC1 in the light-shielding structure array. In this embodiment, the light-shielding structures Z arranged in the first direction x are aligned with each other, and the light-shielding structures Z arranged in the second direction y are also aligned with each other.

In this embodiment, with the arrangement of the light-shielding structure groups, directions of light diffraction around the light-shielding structures are increased, and the intensity of light diffraction in each direction is decreased, alleviating the light diffraction phenomenon and thus improving the imaging quality of the under-screen optical device. In addition, in the light-shielding structure array, the first repeated units, each of which includes a plurality of light-shielding structure groups, are periodically arranged, decreasing complexity of the arrangement of light-shielding structures in the light-shielding structure array and thus decreasing process difficulty of the light-shielding structure array.

Further, for two adjacent light-shielding structure groups in the first direction: the main vertex angles of the two main projections of the two main light-shielding structures onto the base substrate are corresponding angles relative to each other, and the two main vectors of the two main projections have the same direction. That is, when viewed from the top at the same viewing angle, the corresponding angles of the two main projections are oriented identically. With further reference to FIG. 13, two main light-shielding structures Za-1, Za-2 of two adjacent light-shielding structure groups ZZ in the first direction x are marked, and the two main vectors corresponding to the two light-shielding structures Za-1, Za-2 have the same direction. In the first direction x, it is equivalent to that the main light-shielding structure Za-1 rotates in the same direction by different angles to obtain the auxiliary light-shielding structures Zb arranged in sequence, and then continues to rotate to obtain a light-shielding structure that coincides with the original pattern of the main light-shielding structure and serves as the main light-shielding structure of a next light-shielding structure group. In this embodiment, in one light-shielding structure group, the pattern of each light-shielding structure is obtained by rotating an adjacent light-shielding structure by an identical angle, and in the arrangement direction, the last light-shielding structure continues to rotate by the same angle to coincide with the main light-shielding structure. In this way, diffracted light can be uniformly dispersed around the light-shielding structures, and light diffraction has substantially the same intensity in each direction. Therefore, the light diffraction phenomenon can be alleviated to a greater extent.

Further, the p first light-shielding structure groups include p main light-shielding structures arranged in the second direction. The p main projections of the p main light-shielding structures onto the base substrate have the same shape. In the present disclosure, the orthographic projections of the light-shielding structures in the same light-shielding structure group onto the base substrate have the same shape, then in this embodiment, the orthographic projections of the light-shielding structures in the first repeated unit onto the base substrate have the same shape. With further reference to FIG. 13, each light-shielding structure in the first repeated unit CC1 has a square shape. By designing the main light-shielding structure and the rotation angles corresponding to the auxiliary light-shielding structures in each light-shielding structure group, it can achieve that when viewed form the top at the same viewing angle, the corresponding angles of the light-shielding structures in one first repeated unit are different from each other. This is beneficial to uniform dispersion of diffracted light around the light-shielding structures, decreasing the intensity of light diffraction in each direction and alleviating the light diffraction phenomenon.

Figure 15:
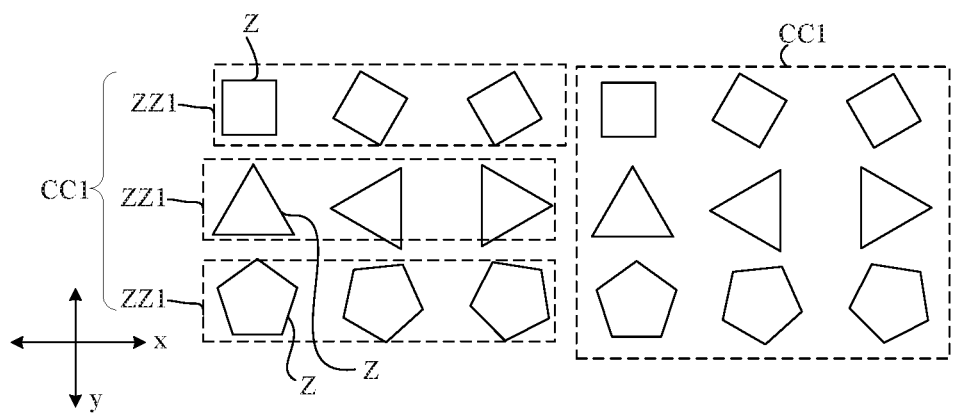
FIG. 15 is a schematic diagram of another arrangement of light-shielding structures in a first display region according to an embodiment of the present disclosure.

FIG. 15 is a schematic diagram of another arrangement of light-shielding structures in the first display region according to an embodiment of the present disclosure. As shown in FIG. 15, taking p=3 as an example, three first light-shielding structure groups ZZ1 sequentially arranged in the second direction y form one first repeated unit CC1, and the light-shielding structures of each of the three first light-shielding structure groups ZZ1 have a different shape from the light-shielding structures of any other one of the three first light-shielding structure groups ZZ1.

Further, in one first repeated unit, the p main projections of the p main light-shielding structures onto the base substrate have the same shape, every two vertex angles of the p main vertex angles of the p main projections are corresponding angles relative to each other, and directions of the main vectors corresponding to the p main light-shielding structures are different from each other. With further reference to FIG. 13, taking p=4 as an example, one light-shielding structure group ZZ1 includes one main light-shielding structure and two auxiliary light-shielding structures. In each light-shielding structure group ZZ1, the auxiliary light-shielding structures are obtained by rotating the main light-shielding structure to different degrees. The main vector corresponding to the main light-shielding structure in each light-shielding structure group ZZ1 is marked in the figure. That is, in this embodiment, the main light-shielding structures are obtained by rotating a same light-shielding structure by different angles. It is equivalent to that the p main light-shielding structures arranged in the second direction y can also form one light-shielding structure group. By designing the rotation angles corresponding to the auxiliary light-shielding structures in each light-shielding structure group, it can achieve that in the first repeated unit, the light-shielding structures arranged in the first direction and the light-shielding structures arranged in the second direction both have a certain regularity, which decreases design complexity of the light-shielding structure array and thus decreases the process difficulty.

Further, in an embodiment, in one first repeated unit, the p main light-shielding structures arranged in the second direction are a first main light-shielding structure to a $p^{th}$ main light-shielding structure in that order. The first main light-shielding structure to the $p^{th}$ main light-shielding structure correspond to a main vector $i_1$ to a main vector $i_p$, respectively. An included angle between two adjacent ones of the main vector $i_1$ to the main vector $i_p$ arranged in the second direction is β, which is constant.

Figure 16:
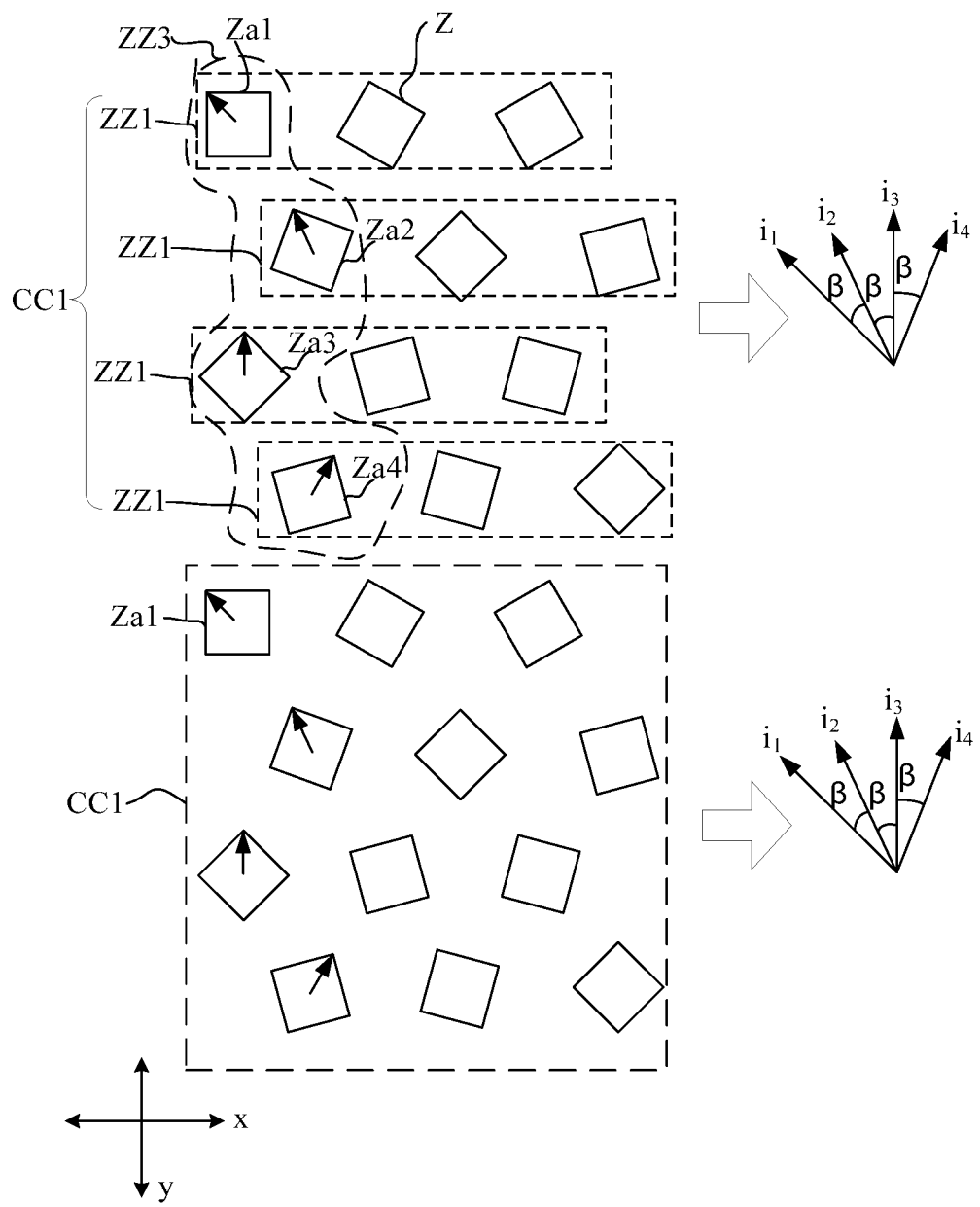
FIG. 16 is a schematic diagram of another arrangement of light-shielding structures in a first display region according to an embodiment of the present disclosure.

FIG. 16 is a schematic diagram of another arrangement of light-shielding structures in the first display region according to an embodiment of the present disclosure. As shown in FIG. 16, taking p=4 as an example, two first repeated units CC1 are illustrated. In one first repeated unit, the four main light-shielding structures arranged in the second direction y are a first main light-shielding structure Za1, a second main light-shielding structure Za2, a third main light-shielding structure Za3 and a fourth main light-shielding structure Za4 in that order. The first main light-shielding structure Za1 corresponds to a main vector $i_1$, the second main light-shielding structure Za2 corresponds to a main vector $i_2$, the third main light-shielding structure Za3 corresponds to a main vector $i_3$, and the fourth main light-shielding structure Za4 corresponds to a main vector $i_4$. An included angle between any two adjacent ones of the main vector $i_1$, the main vector $i_2$, the main vector $i_3$, and the main vector $i_4$ arranged in the second direction is β, which is constant.

In this embodiment, the main light-shielding structures in the first repeated unit CC1 are obtained by rotating a same light-shielding structure by different angles, and the p main light-shielding structures arranged in the second direction y can also form one light-shielding structure group ZZ3. The pattern of each light-shielding structure in the light-shielding structure group ZZ3 can be obtained by rotating an adjacent light-shielding structure by an identical angle β. Through a fit design of rotation angles corresponding to the auxiliary light-shielding structures in the light-shielding structure groups arranged in the first direction and the auxiliary light-shielding structures in the light-shielding structure groups arranged in the second direction, it can achieve that, when viewed from the top at the same viewing angle, the corresponding angles of the light-shielding structures in the first repeated unit are oriented differently from each other. This is beneficial to uniform dispersion of diffracted light around the light-shielding structures, decreasing the intensity of light diffraction in each direction.

Further, with reference to FIG. 16, in two adjacent first repeated units CC1 in the second direction y, two main vectors $i_1$ corresponding to two first main light-shielding structures Za1 have the same direction. In the second direction y, obtain the second main light-shielding structure Za2, the third main light-shielding structure Za3 and the fourth main light-shielding structure Za4 can be considered as obtained by sequentially rotating the first main light-shielding structure Za1 in the same direction by different angles. Then the first main light-shielding structure Za1 continues to rotate to obtain a light-shielding structure that coincides with the original pattern of the first main light-shielding structure Za1 and serves as the main light-shielding structure of a next light-shielding structure group. In this way, diffracted light can be uniformly dispersed around the light-shielding structures, and light diffraction has substantially the same intensity in each direction. Therefore, the light diffraction phenomenon can be alleviated to a greater extent.

Further, each of the p main projections has a shape of a regular polygon, such as a regular triangle, a regular quadrangle, a regular pentagon, a regular hexagon, or a regular pentagram. In this embodiment, the orthographic projection of each light-shielding structure in the first repeated unit onto the base substrate has a shape of a regular polygon, simplifying a design of the light-shielding structure array and facilitating uniform dispersion of diffracted light around the light-shielding structures.

Each of the p main projections has a shape of a regular polygon, and the main projection includes m edges, where m≥3, m is an integer, and $$\beta \leq \frac{360°}{m*p}.$$

With further reference to FIG. 16, taking m=4 and p=4 as an example, then β≤22.5°. The four main light-shielding structures (Za1, Za2, Za3, Za4) arranged in the second direction y form one light-shielding structure group ZZ3. In the light-shielding structure group ZZ3, the pattern of each light-shielding structure can be considered as obtained by rotating the pattern of an adjacent light-shielding structure by an identical angle β. When β=22.5°, the pattern of the first main light-shielding structure Za1 rotates clockwise by 22.5° to obtain the pattern of the second main light-shielding structure Za2, the pattern of the first main light-shielding structure Za1 rotates clockwise by 45° to obtain the pattern the third main light-shielding structure Za3, the pattern of the first main light-shielding structure Za1 rotates clockwise by 67.5° to obtain the pattern of the fourth main light-shielding structure Za4, and the first main light-shielding structure Za1 rotates clockwise by 90° to coincide with the original pattern of the first main light-shielding structure Za1. This embodiment achieves that when viewed from the top at the same viewing angle, the corresponding angles of any two light-shielding structures in the light-shielding structure group constituted by the light-shielding structures arranged in the second direction y are oriented differently, and the corresponding edges extend in different directions, so that diffracted light can be dispersed around the light-shielding structures, alleviating the light diffraction phenomenon. Moreover, when $$\beta = \frac{360°}{m*p},$$

the diffracted light can be uniformly dispersed around the light-shielding structures, and light diffraction has substantially the same intensity in each direction. Therefore, the light diffraction phenomenon can be alleviated to a greater extent, improving the imaging quality of the under-screen optical device.

Further, with reference to FIG. 16, the light-shielding structure has a shape of a regular quadrangle. The first light-shielding structure group ZZ1 includes one main light-shielding structure and two auxiliary light-shielding structures. For example, a difference between the rotation angles corresponding to every two adjacent auxiliary light-shielding structures is 30°. Then in the first light-shielding structure group ZZ1: the main light-shielding structure having the shape of a regular quadrangle rotates clockwise by 30° to obtain the pattern of the first auxiliary light-shielding structure, the main light-shielding structure having the shape of a regular quadrangle rotates clockwise by 60° to obtain the pattern of the second auxiliary light-shielding structure, and the main light-shielding structure having the shape of a regular quadrangle rotates clockwise by 90° to coincide with the main light-shielding structure itself. Four first light-shielding structure groups ZZ1 are arranged in the second direction y, directions of main vectors corresponding to the four main light-shielding structures are different from each other, and when an included angle between any two adjacent main vectors in the second direction y has an identical value such as 22.5°, Then in this embodiment, the first repeated unit CC1 includes twelve light-shielding structures in total, and the corresponding angles of the twelve light-shielding structures are oriented differently from each other. Thus, directions of light diffraction around the twelve light-shielding structures are different from each other, greatly increasing directions of light diffraction around the light-shielding structures, and decreasing the intensity of light diffraction in each direction. In this way, diffracted light can be uniformly dispersed around the light-shielding structures, improving the imaging quality of the under-screen optical device.

Figure 17:
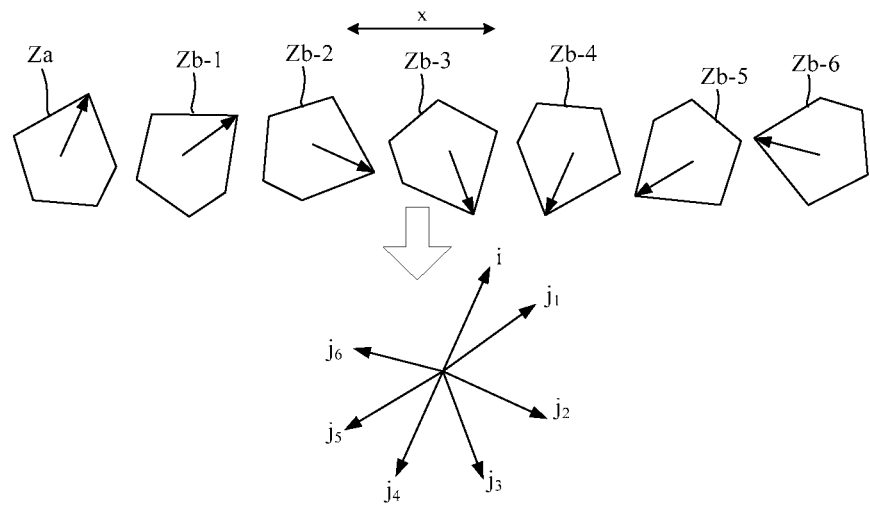
FIG. 17 is a schematic diagram of another arrangement of light-shielding structures in the light-shielding structure group according to an embodiment of the present disclosure.

FIG. 17 is a schematic diagram of another arrangement of light-shielding structures in the light-shielding structure group according to an embodiment of the present disclosure. As shown in FIG. 17, the light-shielding structure group includes a second light-shielding structure group ZZ2. In the second light-shielding structure group ZZ2: the main light-shielding structure Za and six auxiliary light-shielding structures (Zb-1, Zb-2, Zb-3, Zb-4, Zb-5, Zb-6) are arranged in the first direction x, and the six auxiliary light-shielding structures Zb-1, Zb-2, Zb-3, Zb-4, Zb-5, Zb-6 correspond to the auxiliary vectors $j_1$, $j_2$, $j_3$, $j_4$, $j_5$, $j_6$. An included angle between the auxiliary vector j and the main vector i is referred to as a rotation angle. In the second light-shielding structure group ZZ2: the rotation angles corresponding to the six auxiliary light-shielding structures Zb arranged in the first direction x first gradually increase and then gradually decrease. For light-shielding structures having certain shapes, the main light-shielding structure can coincide with itself after rotating by 360° in the plane where the main light-shielding structure is located. Then the light-shielding structure group constituted by such light-shielding structures may be designed to include more auxiliary light-shielding structures, and the corresponding angles of the auxiliary light-shielding structures may be oriented differently from each other. With this implementation, light diffraction around the light-shielding structures can occur in more directions, facilitating uniform dispersion of diffracted light around the light-shielding structures.

In the embodiment corresponding to FIG. 17, the main projection corresponding to the main light-shielding structure has a shape of an irregular polygon, and the main light-shielding structure can coincide with itself after rotating by 360° in the plane where the main light-shielding structure is located, the rotation angles corresponding to the auxiliary light-shielding structures in the arrangement direction first gradually increase and then gradually decrease, and the corresponding angles of the respective auxiliary light-shielding structures are oriented differently from each other.

Figure 18:
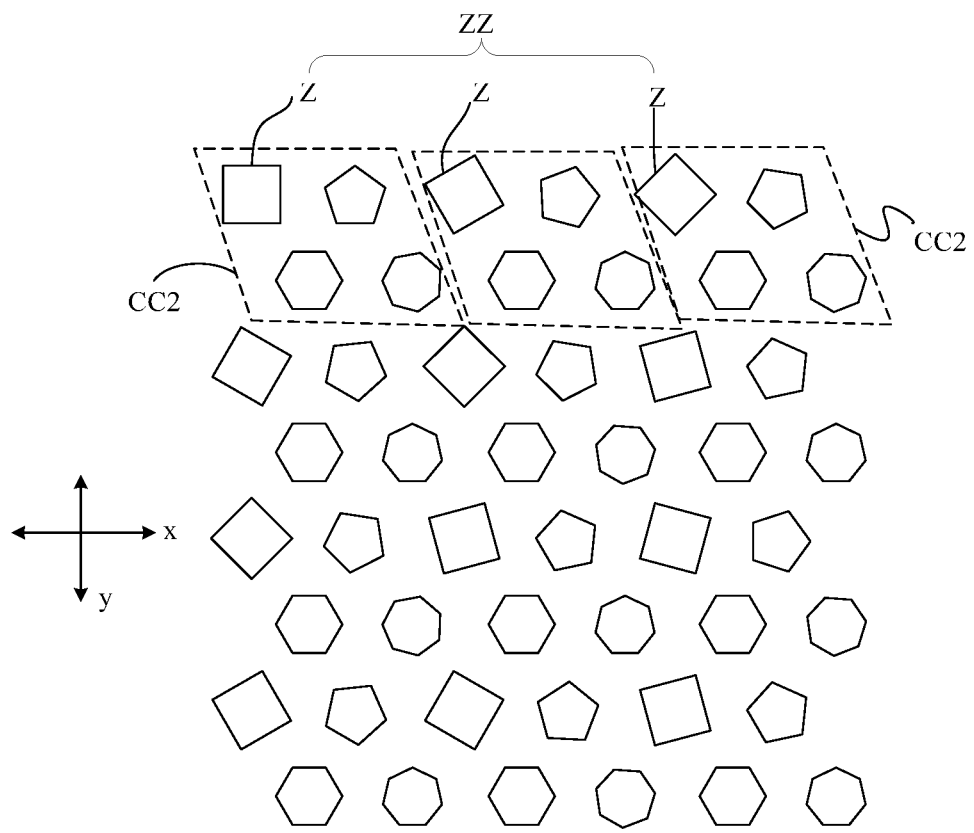
FIG. 18 is a schematic diagram of another arrangement of light-shielding structures in the first display region according to an embodiment of the present disclosure.

FIG. 18 is a schematic diagram of another arrangement of light-shielding structures in the first display region in the embodiment of the present disclosure. In an embodiment, the light-shielding structure array includes a plurality of second repeated units CC2, and each second repeated unit CC2 includes at least two light-shielding structures Z, and the orthographic projections of the at least two light-shielding structures Z onto the base substrate have different shapes. For example, as shown in the figure, one second repeated unit CC2 includes four light-shielding structures Z, and the four light-shielding structures Z have different shapes from each other. The light-shielding structures Z in the light-shielding structure group ZZ belong to different second repeated units CC2. In this embodiment, the light-shielding structures in one light-shielding structure group have the same shape, the shapes of the light-shielding structures in one second repeated unit are not exactly the same, and the light-shielding structures belonging to at least two light-shielding structure groups together form one second repeated unit. The second repeated units are periodically arranged in the light-shielding structure array. In one second repeated unit, the directions of light diffraction around different light-shielding structures are different. In different second repeated units, the directions of light diffraction around different light-shielding structures belonging to the same light-shielding structure group are also different. In this way, directions of light diffraction are increased, facilitating uniform dispersion of diffracted light around the light-shielding structures and thus improving the imaging quality of the under-screen optical device.

Figure 19:
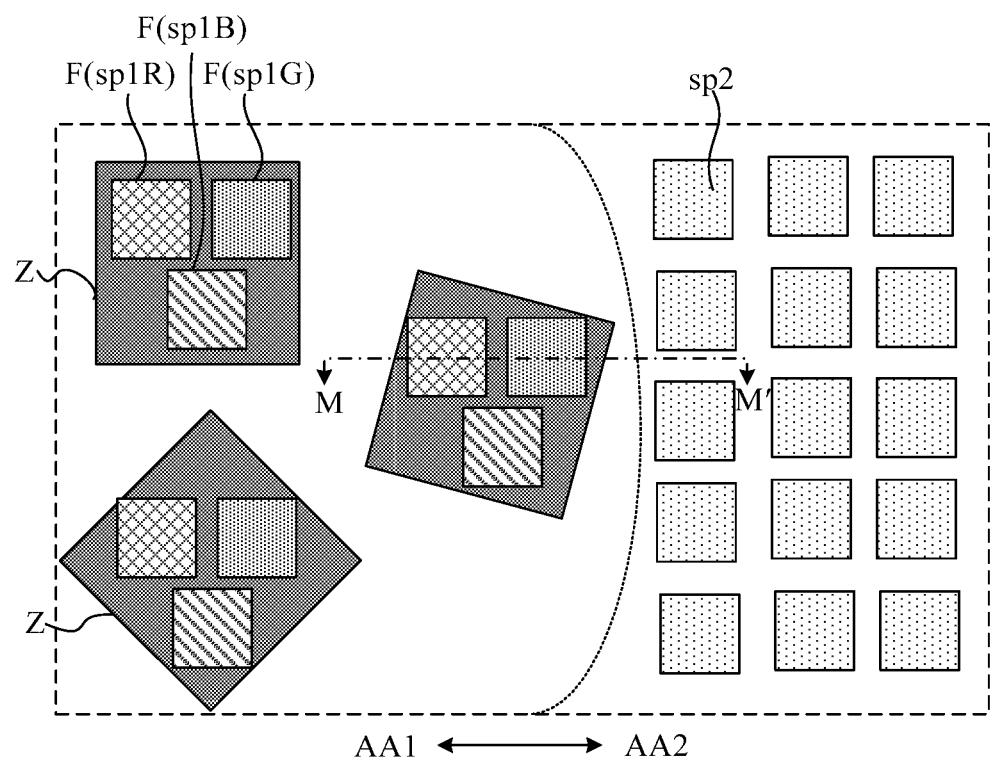
FIG. 19 is another schematic enlarged view of the area Q shown in FIG. 1.

FIG. 19 is another schematic enlarged view of a region Q shown in FIG. 1. In an embodiment, as shown in FIG. 19, the plurality of first sub-pixels includes a plurality of red first sub-pixels sp1R, a plurality of green first sub-pixels sp1G, and a plurality of blue first sub-pixels sp1B. In the direction perpendicular to the display panel, one light-shielding structure Z overlaps the light-emitting region F of one red first sub-pixel sp1R, the light-emitting region F of one green first sub-pixel sp1G, and the light-emitting region F of one blue first sub-pixel sp1B. In this implementation, one light-shielding structure overlaps the light-emitting regions of the first sub-pixels having three colors of red, green and blue. Taking adjacent red first sub-pixel and green first sub-pixel as an example, the light-shielding structure can shield a light-transmitting region between the adjacent red first sub-pixel and green first sub-pixel, decreasing light diffraction between the red first sub-pixel and the green first sub-pixel. That is, such implementation can decrease light diffraction that occurs in a light-transmitting region between adjacent first sub-pixels by a certain extent.

Figure 20:
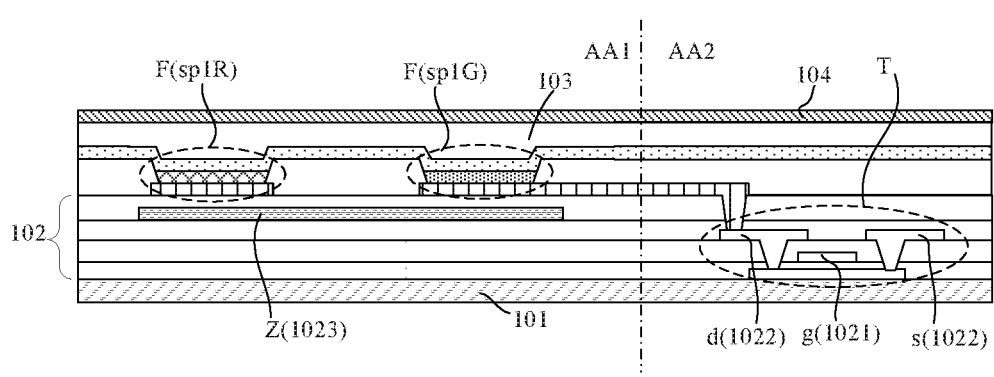
FIG. 20 is a schematic view of a cross-section taken along line M-M' shown in FIG. 19.

In an example, the display panel includes a plurality of pixel circuits located in a second display region, the plurality of pixel circuits includes first pixel circuits, and one first pixel circuit is electrically connected to one first sub-pixel. FIG. 20 is a schematic view of a cross-section taken along line M-M' shown in FIG. 19. FIG. 20 illustrates a transistor T in the first pixel circuit located in the second display region AA2, and an anode of the first sub-pixel is electrically connected to the transistor T. The first pixel circuit for driving the first sub-pixel being arranged in the second display region can be beneficial to decrease an area of a light-shielding region of the first display region, thereby increasing the light transmittance of the first display region. When applied to the design with the under-screen optical device, it can allow a sufficient amount of light to be received by the optical device. Meanwhile, since the first pixel circuit is arranged in the second display region, a gap between metal traces (a gap between metal traces in the first pixel circuit) in the first display region is also decreased. Therefore, it is beneficial to alleviate a light diffraction phenomenon that would occur when light passes through the gap between the metal traces.

FIG. 20 further illustrates the light-shielding structure Z. The array layer 102 includes a gate metal layer 1021, a source-drain metal layer 1022, a capacitor metal layer (not shown), and a third metal layer 1023. The transistor T includes a gate electrode g that is located in the gate metal layer 1021, and a source electrode s and a drain electrode d that are located in the source-drain metal layer 1022. An electrode plate of a storage capacitor in the pixel circuit is located in the capacitor metal layer. The figure illustrates that the light-shielding structure Z is located in the third metal layer 1023, and the third metal layer 1023 is located at a side of the source-drain metal layer 1022 facing away from the base substrate 101. In this implementation, the light-shielding structure is located in the third metal layer, and thus there is no need to change a manufacturing process of the gate metal layer, the source-drain metal layer, and the capacitor metal layer in the array layer during manufacturing.

In an embodiment, in the case where the first pixel circuit for driving the first sub-pixel is arranged in the second display region, the light-shielding structure may be arranged in any one of the gate metal layer, the source-drain metal layer, and the capacitor metal layer, which will not be illustrated herein with a figure.

In some embodiments, the pixel circuit for driving the first sub-pixel is located in the first display region. In this case, the third metal layer may be used to form the light-shielding structure, and the third metal layer is located at a side of the source-drain metal layer facing away from the base substrate, so that the light-shielding structure will not affect wires and devices in the pixel circuit located in the first display region.

In an embodiment, with reference to FIG. 2, in the direction perpendicular to the display panel, one light-shielding structure Z overlaps the light-emitting region F of one first sub-pixel sp1. In this implementation, one light-shielding structure overlaps the light-emitting area of one first sub-pixel. In this case, through a shape match between the light-shielding structure and the light-emitting region of the first sub-pixel, the diffraction phenomenon is alleviated while achieving a smallest area of the individual light-shielding structure, thereby achieving the required light transmittance of the first display region.

Figure 21:
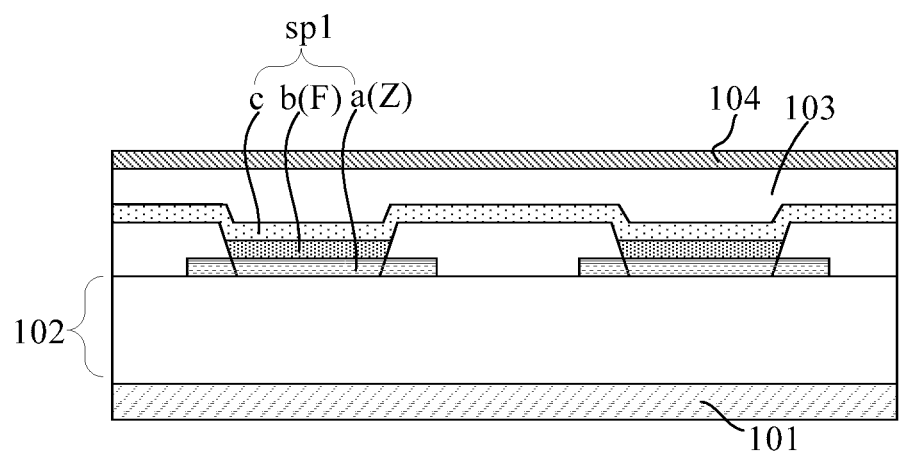
FIG. 21 is another simplified schematic view of the cross-section taken along line H-H' shown in FIG. 2.

FIG. 21 is another simplified schematic view of the cross-section taken along H-H' shown in FIG. 2. As shown in FIG. 21, the first sub-pixel sp1 includes an anode a, a light-emitting layer b, and a cathode c. The anode a is reused as the light-shielding structure Z. In an implementation where one light-shielding structure overlaps the light-emitting region of one first sub-pixel, the anode of the sub-pixel can be used as the light-shielding structure. During the manufacture of the display panel, only the shape of a mask used in the anode etching process step needs to be designed, and no other manufacturing process step needs to be changed and no additional process steps needs to be added, so the manufacturing process is relatively simple.

Figure 22:
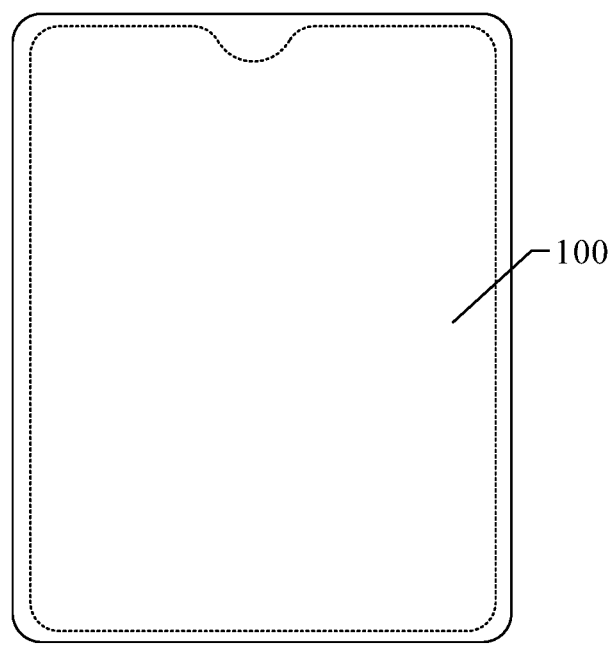
FIG. 22 is a schematic diagram of a display device according to an embodiment of the present disclosure.

An embodiment of the present disclosure further provides a display device. FIG. 22 is a schematic diagram of a display device according to an embodiment of the present disclosure. As shown in FIG. 22, the display device includes the display panel 100 provided by any embodiment of the present disclosure. The structure of the display panel has been described in the above-mentioned embodiments, and will not be repeated herein. The display device in the embodiment of the present disclosure may be any device having a display function, such as a mobile phone, a tablet computer, a notebook computer, an electronic paper book, and a television.

The above-described embodiments are merely exemplary embodiments of the present disclosure and the present disclosure is not limited thereto. Any modifications, equivalent substitutions and improvements made within the principle of the present disclosure shall fall into the protection scope of the present disclosure.

What is claimed is:

1. A display panel, having a display region comprising a first display region and a second display region, the display panel comprising:
   a plurality of sub-pixels located in the display region and comprising first sub-pixels located in the first display region and second sub-pixels located in the second display region, wherein a density of the first sub-pixels is smaller than a density of the second sub-pixels;
   a base substrate; and
   a light-shielding structure array located on the base substrate in the first display region and comprising a plurality of light-shielding structures, wherein the plurality of light-shielding structures is divided into at least one light-shielding structure group,
   wherein in a direction perpendicular to the display panel, one of the plurality of light-shielding structures overlaps a light-emitting region of at least one of the first sub-pixels,
   wherein each of the at least one light-shielding structure group comprises a main light-shielding structure and at least one auxiliary light-shielding structure, an orthographic projection of the main light-shielding structure onto the base substrate is a main projection, an orthographic projection of each of the at least one auxiliary light-shielding structure onto the base substrate is an auxiliary projection, and a shape of the main projection is the same as a shape of the auxiliary projection, and the shape of the auxiliary projection is obtained by rotating the shape of the main projection, the main projection comprises a main vertex angle, the auxiliary projection comprises an auxiliary vertex angle, and the main vertex angle and the auxiliary vertex angle form corresponding angles to each other, a main vector is formed by a gravity center of the main projection as a starting point and a vertex of the main vertex angle as an end point, in each auxiliary projection, an auxiliary vector is formed by a gravity center of the auxiliary projection as a starting point and the auxiliary vertex angle of a vertex of the auxiliary projection as an end point, and a direction of the main vector is different from a direction of the auxiliary vector.

2. The display panel according to claim 1,
wherein the at least one auxiliary light-shielding structure of each of the at least one light-shielding structure group comprises n auxiliary light-shielding structures, where n is an integer greater than or equal to 2, wherein each auxiliary light-shielding structure of the n auxiliary light-shielding structures corresponds to the auxiliary vector of the orthographic projection of the auxiliary light-shielding structure, and two auxiliary vectors corresponding to any two of the n auxiliary light-shielding structures in the light-shielding structure group have different directions.

3. The display panel according to claim 2, wherein
an included angle between the auxiliary vector and the main vector is a rotation angle corresponding to the auxiliary light-shielding structure corresponding to the auxiliary vector; and in the light-shielding structure group, rotation angles corresponding to the n auxiliary light-shielding structures have different values.

4. The display panel according to claim 2, wherein
an included angle between the auxiliary vector and the main vector is a rotation angle; and
the light-shielding structure group comprises a first auxiliary light-shielding structure and a second auxiliary light-shielding structure, a rotation angle corresponding to the first auxiliary light-shielding structure and a rotation angle corresponding to the second auxiliary light-shielding structure have a same value.

5. The display panel according to claim 2,
wherein the at least one light-shielding structure group comprises at least one first light-shielding structure group,
wherein in each of the at least one first light-shielding structure group, the main light-shielding structure and the n auxiliary light-shielding structures are arranged in a first direction, and an included angle between the auxiliary vector and the main vector is a rotation angle corresponding to the auxiliary light-shielding structure corresponding to the auxiliary vector,
wherein in the first light-shielding structure group, rotation angles corresponding to the n auxiliary light-shielding structures gradually increase or decrease in the first direction.

6. The display panel according to claim 5, wherein in the first light-shielding structure group, a smallest one of the rotation angles corresponding to the n auxiliary light-shielding structures is θ, and an included angle between two auxiliary vectors corresponding to two adjacent auxiliary light-shielding structures is equal to θ.

7. The display panel according to claim 6, wherein a shape of the main projection is a regular polygon.

8. The display panel according to claim 7, wherein the main projection comprises m edges, where m is an integer greater than or equal to 3, and $$\theta \le \frac{360°}{m*(n+1)}.$$

9. The display panel according to claim 5, wherein the at least one first light-shielding structure group comprises a plurality of first light-shielding structure groups, the plurality of first light-shielding structure groups comprises p first light-shielding structure groups arranged in a second direction to form a first repeated unit, where p is an integer greater than or equal to 2, and the second direction intersects with the first direction, wherein the light-shielding structure array comprises a plurality of first repeated units that is periodically arranged.

10. The display panel according to claim 9, wherein main vertex angles of two main projections, onto the base substrate, of two main light-shielding structures in two adjacent first light-shielding structure groups arranged in the first direction are corresponding angles to each other, and two main vectors corresponding to the two main projections have a same direction.

11. The display panel according to claim 9, wherein the p first light-shielding structure groups comprise p main light-shielding structures arranged in the second direction; and p main projections of the p main light-shielding structures onto the base substrate have a same shape.

12. The display panel according to claim 11, wherein any two of p main vertex angles of the p main projections are corresponding angles to each other; and main vectors corresponding to the p main light-shielding structures have different directions.

13. The display panel according to claim 12, wherein
in one of the plurality of first repeated units, the p main light-shielding structures arranged in the second direction are a first main light-shielding structure to a $p^{th}$ main light-shielding structure that are sequentially arranged in the second direction;
the first main light-shielding structure to the $p^{th}$ main light-shielding structure correspond to a main vector $i_1$ to a main vector $i_p$, respectively; and
an included angle between any two adjacent main vectors of the main vector $i_1$ to the $p^{th}$ main vector is β, and β is constant.

14. The display panel according to claim 13, wherein two main vectors corresponding to two first main light-shielding structures in two adjacent first repeated units in the second direction have a same direction.

15. The display panel according to claim 13, wherein a shape of the main projection is a regular polygon.

16. The display panel according to claim 15, wherein the main projection comprises m edges, where m is an integer greater than or equal to 3, and $$\beta \leq \frac{360°}{m*p}.$$

17. The display panel according to claim 2, wherein
the at least one light-shielding structure group comprises a second light-shielding structure group;
in the second light-shielding structure group, the main light-shielding structure and the n auxiliary light-shielding structures are arranged in a first direction; and an included angle between the auxiliary vector and the main vector is a rotation angle corresponding to the auxiliary light-shielding structure corresponding to the auxiliary vector; and
in the second light-shielding structure group, rotation angles corresponding to the n auxiliary light-shielding structures gradually increase and then gradually decrease in the first direction.

18. The display panel according to claim 17, wherein a shape of the main projection is an irregular polygon.

19. The display panel according to claim 2,
wherein the plurality of light-shielding structures constitutes a plurality of second repeated units, each of the plurality of second repeated units comprises at least two light-shielding structures, and orthographic projections of the at least two light-shielding structures onto the base substrate have different shapes,
wherein light-shielding structures in each of the at least one light-shielding structure group belong to different second repeated units.

20. The display panel according to claim 1,
wherein the first sub-pixels comprises red first sub-pixels, green first sub-pixels, and blue first sub-pixels,
wherein in a direction perpendicular to the display panel, one light-shielding structure overlaps a light-emitting region of one of the red first sub-pixels, a light-emitting region of one of the green first sub-pixels, and a light-emitting region of one of the blue first sub-pixels.

21. The display panel according to claim 1, wherein in a direction perpendicular to the display panel, one light-shielding structure overlaps a light-emitting region of only one of the first sub-pixels.

22. The display panel according to claim 21, wherein the one first sub-pixel comprises an anode, a light-emitting layer, and a cathode, and the anode is reused as the one light-shielding structure.

23. The display panel according to claim 1, further comprising a plurality of pixel circuits, wherein the plurality of pixel circuits comprises first pixel circuits located in the second display region, and the first pixel circuits are electrically connected to the first sub-pixels in one-to-one correspondence.

24. A display device, comprising a display panel, the display panel having a display region comprising a first display region and a second display region, the display panel comprising:
a plurality of sub-pixels located in the display region and comprising first sub-pixels located in the first display region and second sub-pixels located in the second display region, wherein a density of the first sub-pixels is smaller than a density of the second sub-pixels;
a base substrate; and
a light-shielding structure array located on the base substrate in the first display region and comprising a plurality of light-shielding structures, wherein the plurality of light-shielding structures is divided into at least one light-shielding structure group,
wherein in a direction perpendicular to the display panel, one of the plurality of light-shielding structures overlaps a light-emitting region of at least one of the first sub-pixels,
wherein each of the at least one light-shielding structure group comprises a main light-shielding structure and at least one auxiliary light-shielding structure, an orthographic projection of the main light-shielding structure onto the base substrate is a main projection, an orthographic projection of each of the at least one auxiliary light-shielding structure onto the base substrate is an auxiliary projection, and a shape of the main projection is the same as a shape of the auxiliary projection, and the shape of the auxiliary projection is obtained by rotating the shape of the main projection,
the main projection comprises a main vertex angle, the auxiliary projection comprises an auxiliary vertex angle, and the main vertex angle and the auxiliary vertex angle form corresponding angles to each other,
a main vector is formed by a gravity center of the main projection as a starting point and a vertex of the main vertex angle as an end point,
in each auxiliary projection, an auxiliary vector is formed by a gravity center of the auxiliary projection as a starting point and the auxiliary vertex angle of a vertex of the auxiliary projection as an end point, and
a direction of the main vector is different from a direction of the auxiliary vector.

* * * * *